United States Patent
Kasten et al.

(10) Patent No.: US 9,992,733 B2
(45) Date of Patent: Jun. 5, 2018

(54) DEVICE AND METHOD FOR OPPORTUNISTIC ROAMING

(71) Applicant: APPLE INC., Cupertino, CA (US)

(72) Inventors: Welly Kasten, San Jose, CA (US);
Chaitanya Mannemala, Fremont, CA (US); Kapil Chhabra, Cupertino, CA (US); Veerendra Boodannavar, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 27 days.

(21) Appl. No.: 14/292,620

(22) Filed: May 30, 2014

(65) Prior Publication Data
US 2015/0350993 A1    Dec. 3, 2015

(51) Int. Cl.
*H04W 36/30* (2009.01)
*H04W 48/16* (2009.01)
*H04W 8/18* (2009.01)
*H04W 48/20* (2009.01)

(52) U.S. Cl.
CPC .............. *H04W 48/16* (2013.01); *H04W 8/18* (2013.01); *H04W 48/20* (2013.01)

(58) Field of Classification Search
CPC ........ H04W 8/18; H04W 36/30; H04W 48/16
See application file for complete search history.

(56) References Cited

U.S. PATENT DOCUMENTS

| | | | | |
|---|---|---|---|---|
| 2006/0073827 | A1* | 4/2006 | Vaisanen | H04W 36/0055 455/436 |
| 2008/0089276 | A1* | 4/2008 | Ito | H04W 36/08 370/328 |
| 2008/0298275 | A1* | 12/2008 | De Sousa | H04W 16/18 370/255 |
| 2009/0227255 | A1* | 9/2009 | Thakare | H04W 48/10 455/434 |
| 2012/0224484 | A1* | 9/2012 | Babiarz | H04L 41/5019 370/235 |
| 2015/0038189 | A1* | 2/2015 | Backes | H04L 47/125 455/522 |

* cited by examiner

*Primary Examiner* — Rhonda Murphy
(74) *Attorney, Agent, or Firm* — Fay Kaplun & Marcin, LLP

(57) ABSTRACT

A method, station and computer readable storage medium used to perform opportunistic roaming procedures. A station joined to a basic service set (BSS) of an access point (AP) performs a method including determining a roam profile for the station, the roam profile indicating at least one of available operating bands or available APs for the station, determining a first value associated with a network parameter of the joined AP, determining at least one roam candidate AP having a second value associated with the network parameter corresponding to the roam candidate AP, wherein the first and second values are a received signal strength indicator, determining whether a predetermined criteria value is satisfied based upon the first and second values, wherein the predetermined criteria value is a minimum difference between the first value and second value and roaming to the roam candidate AP when the predetermined criteria value is satisfied.

20 Claims, 13 Drawing Sheets

Single Band Single AP Configuration
500

| Current Band (GHz) | RSSI | | Priority | Scan | | | | | Candidate | | | |
| --- | --- | --- | --- | --- | --- | --- | --- | --- | --- | --- | --- | --- |
| | Upper (dBm) | Lower (dBm) Min. RSSI | | # of Initial Scans (N) | Initial Period (T1) | Backoff Period (p) | Max. Period (T2) | Full Scan Period (T3) | RSSI Delta (dBm) | 2.4 GHz | | 5 GHz | |
| | | | | | | | | | | Boost RSSI (dBm) | Boost Delta (dBm) | Boost RSSI (dBm) | Boost Delta (dBm) |
| 2.4, 5 | -75 | | HIGH | 2 | 30 s | 1 | - | 90 s | +12 | - | - | -65 | +50 |

Fig. 5A

Dual Band Single AP Configuration
505

| Current Band (GHz) | RSSI | | Priority | Scan | | | | | | Candidate | | | | |
| --- | --- | --- | --- | --- | --- | --- | --- | --- | --- | --- | --- | --- | --- | --- |
| | Upper (dBm) | Lower (dBm) | | # of Initial Scans (N) | Initial Period (T1) | Backoff Period (p) | Max. Period (T2) | Full Scan Period (T3) | RSSI Delta (dBm) | 2.4 GHz | | 5 GHz | | |
| | | | | | | | | | | Boost RSSI (dBm) | Boost Delta (dBm) | Boost RSSI (dBm) | Boost Delta (dBm) | |
| 2.4 | Max. RSSI | -75 | LOW | 2 | 3 min | 2 | 24 min | 48 min | +20 | - | - | -65 | +30 | |
| 2.4 | -75 | Min. RSSI | HIGH | 2 | 30 s | 1 | - | 90 s | +12 | - | - | -65 | +50 | |
| 5 | -75 | Min. RSSI | HIGH | 2 | 30 s | 1 | - | 90 s | +12 | Min. RSSI | +10 | -65 | +50 | |

Fig. 5B

| Current Band (GHz) | RSSI | | Priority | Scan | | | | | Candidate | | | | |
|---|---|---|---|---|---|---|---|---|---|---|---|---|---|
| | Upper (dBm) | Lower (dBm) | | # of Initial Scans (N) | Initial Period (T1) | Backoff Period (p) | Max. Period (T2) | Full Scan Period (T3) | RSSI Delta (dBm) | 2.4 GHz Boost RSSI (dBm) | 2.4 GHz Boost Delta (dBm) | 5 GHz Boost RSSI (dBm) | 5 GHz Boost Delta (dBm) |
| 2.4 | Max. RSSI | -50 | LOW | 2 | 3 min | 2 | 12 min | 24 min | +20 | - | - | -65 | +50 |
| 2.4, 5 | -50 | -70 | LOW | 2 | 3 min | 1 | - | 9 min | +15 | - | - | -65 | +50 |
| 2.4 | -70 | Min. RSSI | HIGH | 2 | 30 s | 1 | - | 90 s | +12 | - | - | -65 | +50 |
| 5 | -70 | Min. RSSI | HIGH | 2 | 30 s | 1 | - | 90 s | +12 | Min. RSSI | +10 | -65 | +50 |

Multi-AP Configuration 510

Fig. 5C

DEVICE AND METHOD FOR OPPORTUNISTIC ROAMING

BACKGROUND INFORMATION

A station may be configured to communicate wirelessly by establishing a connection with a network via an access point (AP). The station may associate with the AP using association procedures. The station may include a connection application that is executed to perform this functionality of associating with the AP. The station may also perform a roam in which the station joins a different network or a different AP for the same network. When changing networks, the station may move from a basic service set (BSS) of a first network into a BSS of a second network. As a network may include different operating bands such as 2.4 GHz and 5 GHz, the roam may also include moving from a BSS of a first operating band of a network into a BSS of a second operating band of the same network.

One criteria used in determining whether the station is to perform a roam is a received signal strength indicator (RSSI). The RSSI may indicate a quality and/or strength associated with a connection to a network. The RSSI criteria is limited to one per band. For example, the RSSI criteria may be a minimum threshold value for the RSSI in the 2.4 GHz band and a minimum threshold value for the RSSI in the 5 GHz band. Thus, when the signal strength drops below this minimum threshold value, the station may be configured to perform the roam. The minimum threshold value is set to a value where the low signal strength impacts the performance of the station. This means a roam will not be attempted until the current connection is deemed suboptimal.

BRIEF DESCRIPTION OF THE DRAWINGS

FIG. 5A shows an exemplary set of configurations used for roaming from a single band single access point (AP) roam profile.

FIG. 5B shows an exemplary set of configurations used for roaming from a dual band single AP roam profile.

FIG. 5C shows an exemplary set of configurations used for roaming from a multi-AP roam profile.

SUMMARY

Figure 1:
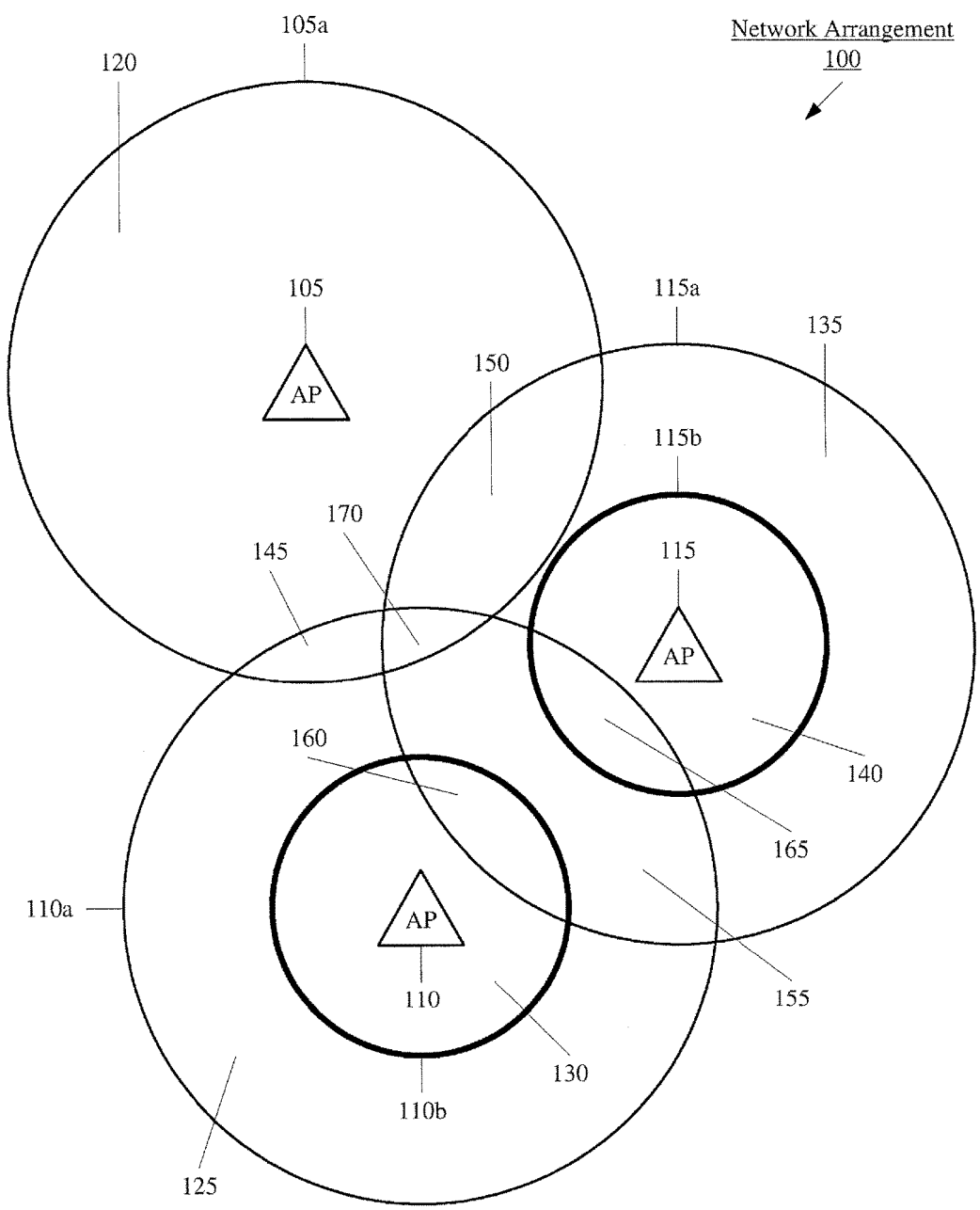
FIG. 1 shows an exemplary network arrangement including various roam profiles.

The exemplary embodiments describe a method performed by a station joined to a basic service set (BSS) of an access point (AP). The method including determining a roam profile for the station, the roam profile indicating at least one of available operating bands or available APs for the station, determining a first value associated with a network parameter of the joined AP, determining at least one roam candidate AP having a second value associated with the network parameter corresponding to the roam candidate AP, wherein the first and second values are a received signal strength indicator, determining whether a predetermined criteria value is satisfied based upon the first and second values, wherein the predetermined criteria value is a minimum difference between the first value and second value and roaming to the roam candidate AP when the predetermined criteria value is satisfied.

The exemplary embodiments further describe a station having a transceiver configured to establish a connection with an access point for the station to join a basic service set (BSS) thereof and a processor. The processor and transceiver are configured to perform an opportunistic roam from the joined AP to one of at least one roam candidate AP by determining a roam profile for the station, the roam profile indicating at least one of available operating bands and available APs for the station, determining a first value associated with a network parameter for the joined AP, determining the at least one roam candidate AP having a second value associated with the network parameter corresponding to the roam candidate AP, determining whether a predetermined criteria value is satisfied based upon the first and second values and roaming to the roam candidate AP when the predetermined criteria value is satisfied.

The exemplary embodiments also describe a non-transitory computer readable storage medium with an executable program stored thereon. The program instructs a microprocessor to perform operations including determining a roam profile for the station, the roam profile indicating at least one of available operating bands and available APs for the station, determining a first value associated with a network parameter for a joined AP, determining at least one roam candidate AP having a second value associated with the network parameter corresponding to the roam candidate AP, determining whether a predetermined criteria value is satisfied based upon the first and second values and roaming to the roam candidate AP when the predetermined criteria value is satisfied.

The exemplary embodiments may be further understood with reference to the following description and the related appended drawings, wherein like elements are provided with the same reference numerals. The exemplary embodiments are related to a device and method for performing an opportunistic roam. Specifically, a station may associate with a network via an access point (AP) to join the basic service set (BSS). The AP may include only one operating band or may have two operating bands. A given area may include one operating area of a network or multiple operating areas of different networks overlapping. Accordingly, the station may be in a location in which one or two operating bands are available and/or one or more networks are available. Depending on a received signal strength indicator (RSSI), the station may determine whether a roam is to be performed from a first network to a second network or from a first operating band of a network to a second operating band of the network. The station may also perform the roam based upon different trigger points or thresholds for the RSSI.

DETAILED DESCRIPTION

FIG. 1 shows an exemplary network arrangement 100 including various roam profiles. As illustrated, the network arrangement 100 includes a plurality of APs such as AP 105, AP 110, and AP 115. A station disposed in the network arrangement 100 may be configured to communicate with any of the APs 105-115. However, it should be noted that the network arrangement 100 may have any number of APs with which the station may communicate. For example, the network arrangement 100 may have a single AP with which the station is capable of communicating. In another example, the network arrangement 100 may have more than three APs with which the station is capable of communicating. Each of the APs 105-115 may have a single operating band or a dual operating band. In the network arrangement 100, the AP 105 may have a single operating band at 2.4 GHz which has an operating area 105a. The AP 110 may have dual operating bands at 2.4 GHz and 5 GHz which have operating areas 110a, 110b, respectively. The AP 115 may also have dual operating bands at 2.4 GHz and 5 GHz which have operating areas 115a, 115b, respectively. It should be noted that this configuration of the APs 105-115 in the network arrangement 100 is only exemplary. For example, the AP 105 may have a single operating band at 5 GHz; the AP 105 may have dual operating bands; the APs 110, 115 may have a single operating band; etc.

Those skilled in the art will understand that the 5 GHz operating band may include advantages over 2.4 GHz operating band and vice versa, depending on the needs of the users of the stations. The operating band may partially relate to the speed of a wireless network, but it is not the exclusive differentiator between bands. For example, networks that operate under the IEEE 802.11a standard at 5 GHz support the same maximum data rate of 54 Mbps as networks that operate under the IEEE 802.11g standard at 2.4 GHz. In a perfect environment, a station operating in the 5 GHz operating band may carry more data than in the 2.4 GHz operating band. However, the higher the frequency of the operating band, the shorter its range. Thus, as shown in FIG. 1 and described in more detail below, the operating area of a 2.4 GHz operating band may be larger than the operating area of the 5 GHz operating band. In another difference, signals in the 5 GHz operating band may not penetrate solid objects nearly as well as wireless signals in the 2.4 GHz operating band. This may cause issues in environments with many solid objects such as a home networking environment. Thus, it may be beneficial to operate home networks on the 2.4 GHz band. On the other hand, because the 2.4 GHz operating band is commonly used in consumer products, there may be a higher likelihood that wireless signals in the 2.4 GHz operating band may experience interference from these other consumer products. From these examples, it should be seen that the 5 GHz operating band and the 2.4 GHz operating band are different wireless signaling frequencies that each have advantages for wireless networks.

It should be noted that the AP including the operating bands at 2.4 GHz and 5 GHz is only exemplary. Although the following is described with regard to these operating bands, those skilled in the art will understand that the exemplary embodiments may be adapted for different operating bands as well without deviating from the manners in which the opportunistic roam is performed. Furthermore, the AP potentially including two operating bands is also only exemplary. Those skilled in the art will understand that the AP may include more than two operating bands and the exemplary embodiments may be adapted for further operating bands beyond the two exemplary bands that are described herein.

The operating areas 105a, 110a, 110b, 115a, 115b may enable the station to associate with the respective AP 105-115 such that only a single operating band is available from one AP, both dual operating bands are available from one AP, or more than one operating band from multiple APs are available. It is noted that the operating areas 105a, 110a, 110b, 115a, 115b having circular shapes is only exemplary. Those skilled in the art will understand that an AP may have a respective operating area having any shape (e.g., oblong) depending on a variety of factors such as physical objects. However, for illustrative purposes, the operating areas 105a, 110a, 110b, 115a, 115b are shown as circular. Typically, the 2.4 GHz operating band provides a greater coverage area than the 5 GHz operating band. Accordingly, the operating area 110b is entirely within the operating area 110a (e.g., as concentric circles) while the operating area 115b is entirely within the operating area 115a as both operating bands originate from the respective AP. The network arrangement 100 shows different areas resulting from the disposition of the operating areas 105a, 110a, 110b, 115a, 115b.

In a first type of area, the station may be able to associate with a single AP. In a first sub-type, only a single operating band of the AP may be available for the station. As shown in FIG. 1, in an area 120 the station may be able to join the BSS of the AP 105 in the 2.4 GHz operating band; in an area 125 the station may be able to join the BSS of the AP 110 in the 2.4 GHz operating band; and in the area 135 the station may be able to join the BSS of the AP 115 in the 2.4 GHz operating band. In a second sub-type, both of the dual operating bands from an AP may be available for the station. As shown in FIG. 1, in an area 130 the station may be able to join the BSS of the AP 110 in the 5 GHz operating band and in an area 140 the station may be able to join the BSS of the AP 115 in the 5 GHz operating band. As the APs 110, 115 also provide the operating areas 110a, 115a, respectively, that encompass the operating areas 110b, 115b, respectively, the station in either the area 130 or the area 140 may also be able to join the BSS of the AP 110, 115, respectively, in the 2.4 GHz operating band.

In a second type of area, the station may be able to associate with more than one AP. That is, the operating areas 105a, 110a, 110b, 115a, 115b may overlap such that more than one network may be joined. Furthermore, depending on the location of the station and manner in which the operating areas 105a, 110a, 110b, 115a overlap, the station may be able to join a BSS of different operating bands. As shown in FIG. 1, in an area 145 the station may be able to join the BSS of the AP 105 in the 2.4 GHz operating band or the BSS of the AP 110 in the 2.4 GHz operating band; in an area 150 the station may be able to join the BSS of the AP 105 in the 2.4 GHz operating band or the BSS of the AP 115 in the 2.4 GHz operating band; in an area 155 the station may be able to join the BSS of the AP 110 in the 2.4 GHz operating band or the BSS of the AP 115 in the 2.4 GHz operating band; in an area 160 the station may be able to join the BSS of the AP 110 in either the 2.4 GHz operating band or the 5 GHz operating band or the BSS of the AP 115 in the 2.4 GHz operating band; in an area 165 the station may be able to join the BSS of the AP 115 in either the 2.4 GHz operating band or the 5

GHz operating band or the BSS of the AP 110 in the 2.4 GHz operating band; and in an area 170 the station may be able to join the BSS of the AP 105 in the 2.4 GHz operating band, the BSS of the AP 110 in the 2.4 GHz operating band, or the BSS of the AP 115 in the 2.4 GHz operating band.

With the various types of areas in which the station may potentially be located, the station may be under a specified roam profile. Specifically, the roam profile may include a single band single AP (SBSA) roam profile, a dual band single AP (DBSA) roam profile, or a multi-AP roam profile. The SBSA roam profile relates to when only a single operating band is available from a single AP. The SBSA roam profile may be when the station is in one of the areas 120, 125, 135. As described above, the areas 120, 125, 135 relate to when only the 2.4 GHz operating band of the APs 105, 110, 115, respectively, is available. The DBSA roam profile relates to when both operating bands are available from a single AP. The DBSA roam profile may be when the station is in one of the areas 130, 140. As described above, the areas 130, 140 relate to when the 2.4 GHz operating band and the 5 GHz operating band of the APs 110, 115, respectively, are available. The multi-AP roam profile relates to when operating bands from different APs are available. The multi-AP roam profile may be when the station is in one of the areas 145, 150, 155, 160, 165, 170. As described above, the areas 145-170 relate to when any combination of the 2.4 GHz operating bands of the APs 105-115 and the 5 GHz operating bands of the APs 110, 115 are available.

The station may be configured to associate with any of the APs 105-115 in a respective operating band thereof. For example, the station may associate with the AP 105 to join the BSS of the 2.4 GHz operating band. In another example, the station may associate with the AP 110 to join the BSS of the 5 GHz operating band. To associate with an AP, the station may include a connection application that is executed to perform this functionality. Furthermore, the station may include a roam application that is executed to perform the opportunistic roam functionality as described in further detail below.

Figure 2:
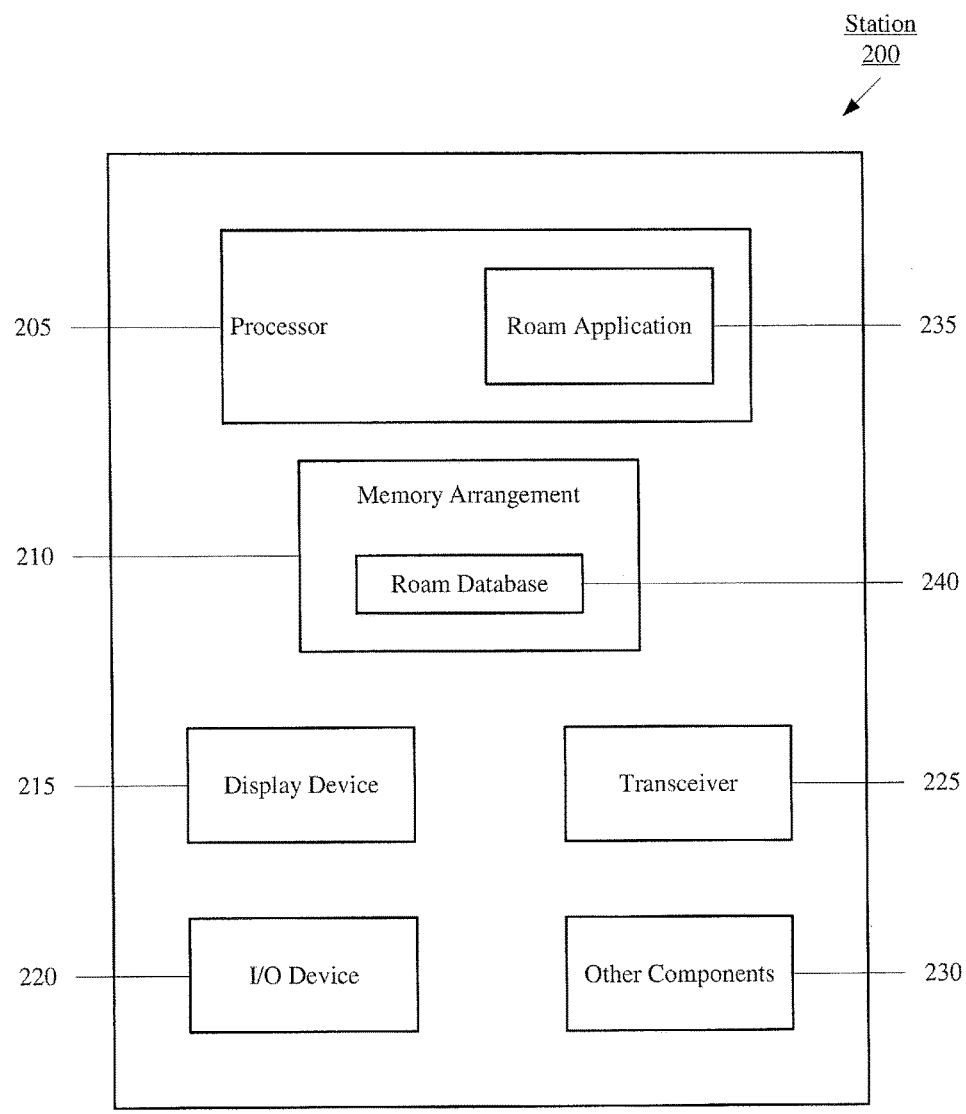
FIG. 2 shows the exemplary station configured to use a roam application within the exemplary network arrangement of FIG. 1.

FIG. 2 shows an exemplary station 200 configured to use the roam application 235. Specifically, the station 200 may use the roam application 235 while located within an area of the network arrangement 100 of FIG. 1. The station 200 may be any electronic component configured to join a network via an AP. For example, the station 200 may be a portable device such as a cellular phone, a smartphone, a tablet, a phablet, a laptop, etc. In another example, the station 200 may be a stationary device such as a desktop terminal. The station 200 may include a processor 205, a memory arrangement 210, a display device 215, an input/output (I/O) device 220, a transceiver 225, and other components 230 such as a portable power supply, an audio (I/O) device, etc.

The processor 205 may be configured to execute a plurality of applications of the station 200. The processor may be an applications processor or a processor associated with a WiFi chip of the station 105 that may execute applications stored in firmware, or a combination thereof. In another example, the applications may include a connection application that is used to join a BSS of an AP. In a further example and according to the exemplary embodiments, the applications may include a roam application 235 that is used to perform an opportunistic roam. Specifically, depending on the roam profile of the area in which the station 200 is located, the roam application 235 may determine when a roam is to be performed based upon a set of configurations related to the roam profile, as will be described in further detail below. In addition, the roam application 235 may also generate the roam profiles based upon a learning behavior from joining the various BSSs of the APs. It should be noted that the roam application 235 being an application (e.g., a program) executed by the processor 205 is only exemplary. The roam application 235 may also be represented as a separate incorporated component of the station 200 or may be a modular component coupled to the station 200.

The memory arrangement 210 may be a hardware component configured to store data related to operations performed by the station 200. Specifically, the memory arrangement 210 may store the roam profiles, roam clusters used to generate the roam profiles, the set of configurations, etc. In the example of FIG. 2, this information may be stored in the roam database 240. An exemplary manner of populating and maintaining the roam database 240 will be described in greater detail below.

The display device 215 may be a hardware component configured to show data to a user while I/O device 220 may be a hardware component configured to receive inputs from the user and output corresponding data. The transceiver 225 may be a hardware component configured to transmit and/or receive data. That is, the transceiver 225 may enable communication with other electronic devices such as the APs 105-115. The transceiver 225 may operate on a variety of different frequencies or channels (e.g., set of consecutive frequencies) that are related to the APs 105-115. The other components 230 may include a portable power supply (e.g., battery) if the station 105 is portable, a data acquisition device, ports to electrically connect the station 105 to other electronic devices, etc.

As discussed above, the station 200 may execute the roam application 235 such that the opportunistic roam may be performed based upon a roam profile of the area in which the station 200 is located. As will be described in further detail below, the roam application 235 may perform a SBSA roam process using a set of SBSA configurations when the station 200 is in the areas 120, 125, 135 having the SBSA roam profile; may perform a DBSA roam process using a set of DBSA configurations when the station 200 is in the areas 130, 140 having the DBSA roam profile; or may perform a multi-AP roam process using a set of multi-AP configurations when the station 200 is in the areas 145-170 having the multi-AP roam profile. However, prior to being configured to perform the roam process based upon the roam profile using the set of respective configurations, the roam application 235 may determine as well as store the roam profiles for the areas 120-170. Specifically, the roam application 235 may include a learning behavior such that operating bands and networks in which the station 200 has joined the BSS thereof may be stored to subsequently determine the corresponding roam profile.

Figure 3:
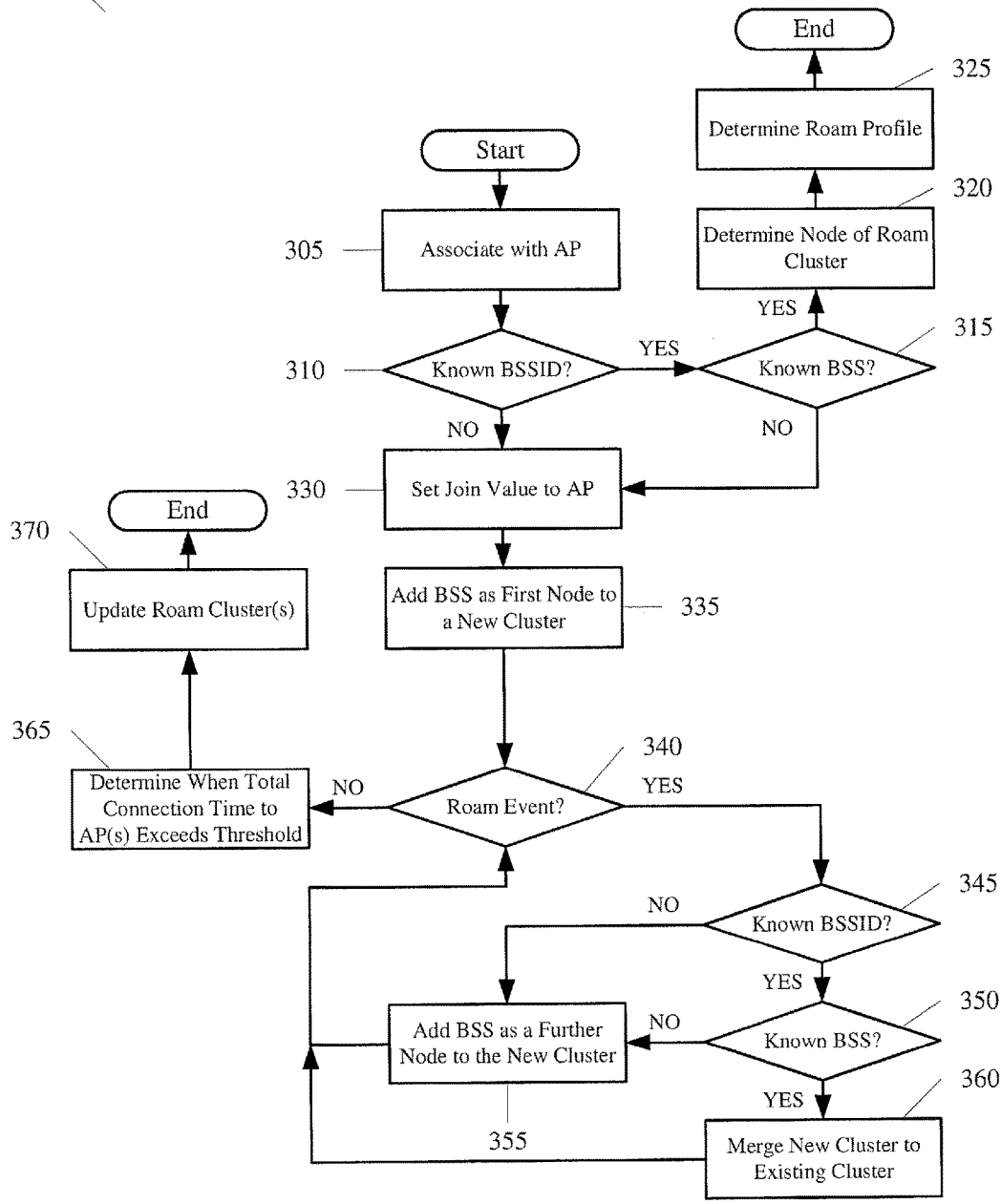
FIG. 3 shows an exemplary method of determining a roam cluster for the exemplary network arrangement of FIG. 1.

FIG. 3 shows an exemplary method 300 of determining a roam cluster for the exemplary network arrangement 100 of FIG. 1. A roam cluster may be considered to be an aggregation of areas within the network arrangement 100 having interconnections that indicate when a potential roam may be performed. As will be described in further detail below, the roam clusters may be used as a basis to determine the corresponding area and its roam profile. The method 300 may be a first portion of a process of updating and maintaining the roam database 240 including information of roam profiles for the areas in the network arrangement 100. The method 300 will be described with reference to the network arrangement 100 of FIG. 1 and the station 200 of FIG. 2.

In step 305, the connection application is executed to associate with an AP. For example, the station 200 may associate with the AP 105. When this association process occurs, the roam application 235 may determine the BSSID of the AP 105 as well as the BSS that is joined for the AP 105. Each time the station 200 joins an operating band of a network, the roam application 235 may log the association event into the roam database 240 stored in the memory arrangement 210. In this example, the roam application 235 may log the association event with the BSS identification (BSSID) of the AP 105, the BSS that is joined for the operating band of the AP 105, a time stamp of when the association event occurred, and any other relevant information.

In step 310, the roam application 235 determines whether the BSSID of the AP 105 is a known BSSID. This determination is a determination of whether the BSSID for the currently associated AP corresponds to a previously associated with AP or is a new AP, i.e., has the station 200 previously associated with AP 105. The roam application 235 may make this determination by comparing the BSSID for the AP with the stored information in the roam database 240.

If the BSSID of the AP 105 is known, the method 300 continues to step 315. In step 315, the roam application 235 determines whether the BSS that is joined is known. A known BSSID is not a guarantee that the interconnections to other areas in which to roam are known. For example, a network may include various operating areas at different locations. However, when the BSSID and the BSS information are both known, the roam application 235 may identify the area in which the station 200 is located. For example, when the BSSID information corresponds to the AP 110 and the BSS information corresponds to the 2.4 GHz band of the network associated with the AP 110, the station 200 may be located in one of the areas 125, 145, 155, 165, 170. The station 200 may also include a location application that determines a geographic location of the station 205 (e.g., global positioning system (GPS), triangulation, satellite positioning, etc.). Using the geographic location of the station 205, the roam application 235 may further identify which area the station 200 is currently located. For example, the location application may indicate that the station 200 is located within the area 125. Further information may also be utilized as a basis to identify the area in which the station 200 is located such as BSSID and BSS information relative to other APs with which the station 200 is capable of communicating.

Thus, when the roam application 235 determines that the network/AP combination that is joined is already in the roam database 240 and is therefore a network/AP combination that has been previously joined, the roam application 235 will determine that the roam profile for this area has already been determined. As the information is already stored in the roam database 240, the roam application 235 may reference this roam database 240 and determine the corresponding roam profile indicated in the roam database 240. Thus, in step 320, the roam application 235 determines the roam cluster associated with the known BSSID and BSS within the roam database 240. More specifically, the roam application 235 may identify the node within the roam cluster. Accordingly, in step 325, the roam application 235 may determine the roam profile associated with the node having the known BSSID and BSS.

Returning to step 310, if the BSSID is not known, the method 300 continues to step 330. Also returning to step 315, if the BSS is not known, the method 300 continues to step 330. Since the BSSID, the BSS, or both may be unknown, the network that is joined may be considered a new network and not stored in the roam database 240.

Therefore, in step 330, the roam application 235 sets a join value or a time stamp in which the BSS of the AP having the BSSID is joined. Since the station 200 may temporarily join the network (e.g., for a brief time), the roam application 235 may be configured to update the roam database 240 when the joined network has a greater likelihood to be joined at a later time by the station 200. As will be described in further detail below, when the network has been joined for a predetermined amount of time from using a predetermined join threshold value, the roam application 235 may determine when the roam database 240 including the roam clusters is to be updated with this new network. That is, when the AP is not joined for at least this predetermined join threshold value, the roam database 240 may be overwhelmed with superfluous data that may result in increased processing time. However, it should be noted that the BSSID and BSS information is still stored with a corresponding accumulated join time to the network such that this accumulated time may be used as the basis for the predetermined join threshold value.

In step 335, the roam application 235 generates a new cluster including a node for the BSS of the AP having the BSSID. As a new cluster, at this stage, there is only one node in the cluster. In order to determine whether this new cluster is to be incorporated into an existing cluster or whether this new cluster is to be expanded, the station 200 may roam from the BSS of the AP having the BSSID to further BSSs of APs having a different or same BSSID.

In step 340, the roam application 235 determines whether the station 200 has roamed. Specifically, the determination relates to when a roam event has occurred. If no roam event occurs, the method 300 continues to step 365. In step 365, the roam application 235 determines whether a total connection time to the BSS of the AP having the BSSID has exceeded the predetermined join threshold value. As discussed above, the station 200 may join a BSS of an AP having a BSSID on a temporary basis but may never join this BSS again. Thus, an update of the roam cluster related to this BSS of the AP having the BSSID is only performed when this predetermined join threshold value is exceeded, thereby increasing the likelihood that this roam cluster will subsequently be used or be useful. It should again be noted that the total connection time may relate to a total accumulated connection time for the BSS of the AP having the BSSID. Thus, when the station 200 joins this BSS at a subsequent time, the join value may be updated in step 330 to incorporate any connection time from a previous session (which may be stored in the roam database 240). However, it should be noted that the total connection time may also relate to a single session and the connection time may reset for each session. When the total connection time is greater than the predetermined join threshold value, the method 300 continues to step 370. In step 370, the roam application 235 updates the roam cluster in the roam database 240. Specifically, given the above scenario, the roam cluster includes a single node representing the BSS of the AP having the BSSID.

Returning to step 340, when a roam event occurs, the method 300 continues to step 345. When the roam occurs, the roam application 235 may determine the BSSID of the AP corresponding to the network that is joined from the roam as well as the BSS that is joined for this network. Thus, a substantially similar analysis as discussed above with reference to steps 310 and 315 may be performed. Specifically, in step 345, the roam application 235 determines whether the BSSID is known while in step 350, the roam application 235 determines whether the BSS is known.

Again, the roam database 240 may be referenced to make this determination. It should be noted that step 340 may be performed each time the station 200 performs a roam. Thus, the roam cluster may be updated for each roam event that takes place.

When the BSSID and the BSS are unknown, the method 300 continues to step 355. In step 355, the roamed BSS of the roamed AP having the roamed BSSID is added as a further node in the new roam cluster generated for the BSS of the original AP having the BSSID which has a node in this roam cluster. As the roam event occurred, an interconnection may also be established between these APs regarding the BSS. In this manner, the roam cluster that has been generated may be updated or extended. Subsequently, the method 300 returns to step 340 to determine whether any further roam events occur. By continuing this process, the roam cluster may be further extended in which the interconnections are updated to determine how the network arrangement 100 is configured that enables a roam from a first BSS of a network to move to a second BSS of a different or same network.

However, when the BSSID and the BSS are known, the method 300 continues to step 360. In step 360, the roam application 235 determines the existing roam cluster for the roamed BSS of the roamed AP having the roamed BSSID in order to merge the new roam cluster including the BSS of the originating AP having the BSSID as a node to the existing roam cluster. Accordingly, the node of the BSS of the originating AP having the BSSID may be an extension of an existing roam cluster. Subsequently, the method 300 returns to step 340 to determine whether any further roam events occur. Again, by continuing this process, existing roam cluster may be further extended having further interconnections that are determined for possible roam events that may later occur. When the steps 345-360 are performed and when no further roam event occurs, the method 300 continues to step 365 and 370. However, when the roam cluster is updated in step 365, the new roam cluster or the existing roam cluster includes more than one node. After the roam clusters have been updated, the roam application 235 may determine the roam profile to be assigned for these roam clusters. Specifically, the roam application 235 may determine the roam profile to be assigned for a given area in which the station 200 is located.

It should be noted that the merging of the roam clusters may be performed for various reasons. The roam application 235 may be configured to handle a case where two networks having a common BSSID and security settings have multiple BSSs. For example, a public WiFi hotspot may enable the station 200 to join the network having the same BSSID. However, the public WiFi hotspot may have operating areas in various locations, thereby including a corresponding BSS for each location. Therefore, the area that relates to one location for this hotspot may be different than another area that relates to a second location for this hotspot. In this manner, the adjacent areas in which the station 200 may roam may also be different for each location. Only when the BSSID and the BSS correspond will the roam application 235 be configured to merge the roam clusters to prevent an interconnection in which a roam that is not possible from being created.

It should also be noted that the roam clusters that are created may be stored as intermediary data. Specifically, when nodes in the roam cluster do not pass the predetermined join threshold value, the roam application 235 may store a temporary updated roam cluster. In this manner, the roam application 235 may enable the join value to be updated for a subsequent time that the station 200 joins the BSS of the node and update the accumulated join value. Then, as discussed above, when the roam cluster includes nodes that have exceeded the predetermined join threshold value, the roam cluster may be updated in the roam database 240 for further processing.

It should further be noted that the roam clusters may be stored in perpetuity or may be updated in the roam database 240 based upon a timer or input value. When stored in perpetuity, the roam clusters may always be available for access in the roam database 240. This embodiment may further entail removing the use of the predetermined join threshold value. Thus, any roam cluster that is ever created may be stored and utilized. When updated when no roam event occurs, the roam application 235 may determine whether any nodes or roam clusters have become stale. For example, a node or a roam cluster may not be accessed for a predetermined amount of time. When this time is exceeded, the roam application 235 may determine the node/cluster to be stale and remove or unlearn it from the roam database 240, thereby a subsequent joining of the BSS results in a determination of a new network. Accordingly, a period housekeeping functionality may be used by the roam application 235. In another example, a node or a roam cluster may be removed or unlearned if the user of the station 200 manually removes this node or cluster. This may prompt the roam application 235 to update the roam clusters.

Once the roam clusters have been updated and/or created, the roam application 235 may determine a corresponding roam profile for nodes in the roam clusters. Specifically, when the node corresponds to an area of the network arrangement 100, the updated/new roam clusters may be analyzed to determine the roam profile to be assigned. Based upon a variety of factors, the roam application 235 may determine whether the SBSA roam profile, the DBSA roam profile, or the multi-AP roam profile is to be assigned.

As described above, the roam cluster may be an aggregation of interconnected networks and corresponding operating bands in which the interconnections relate to a potential roam that may be performed. To provide a specific example, as illustrated in the network arrangement 100, a roam cluster may include the area 145 as a node. Using the area 145 as an originating node, the interconnections may indicate that the areas 120, 125, 170 (and possible 150) may be further nodes that represent potential roam areas for the station 200. These areas may be incorporated into the roam cluster where each node also has a corresponding roam profile. It should be noted that each area 120-170 of the network arrangement 100 may be included within a single roam cluster as each area is at least indirectly connected to another area. In a substantially similar manner, a further network arrangement that is independent of the network arrangement 100 may be stored as a further roam cluster having its own nodes and interconnections (with corresponding roam profiles associated therewith).

Figure 4:
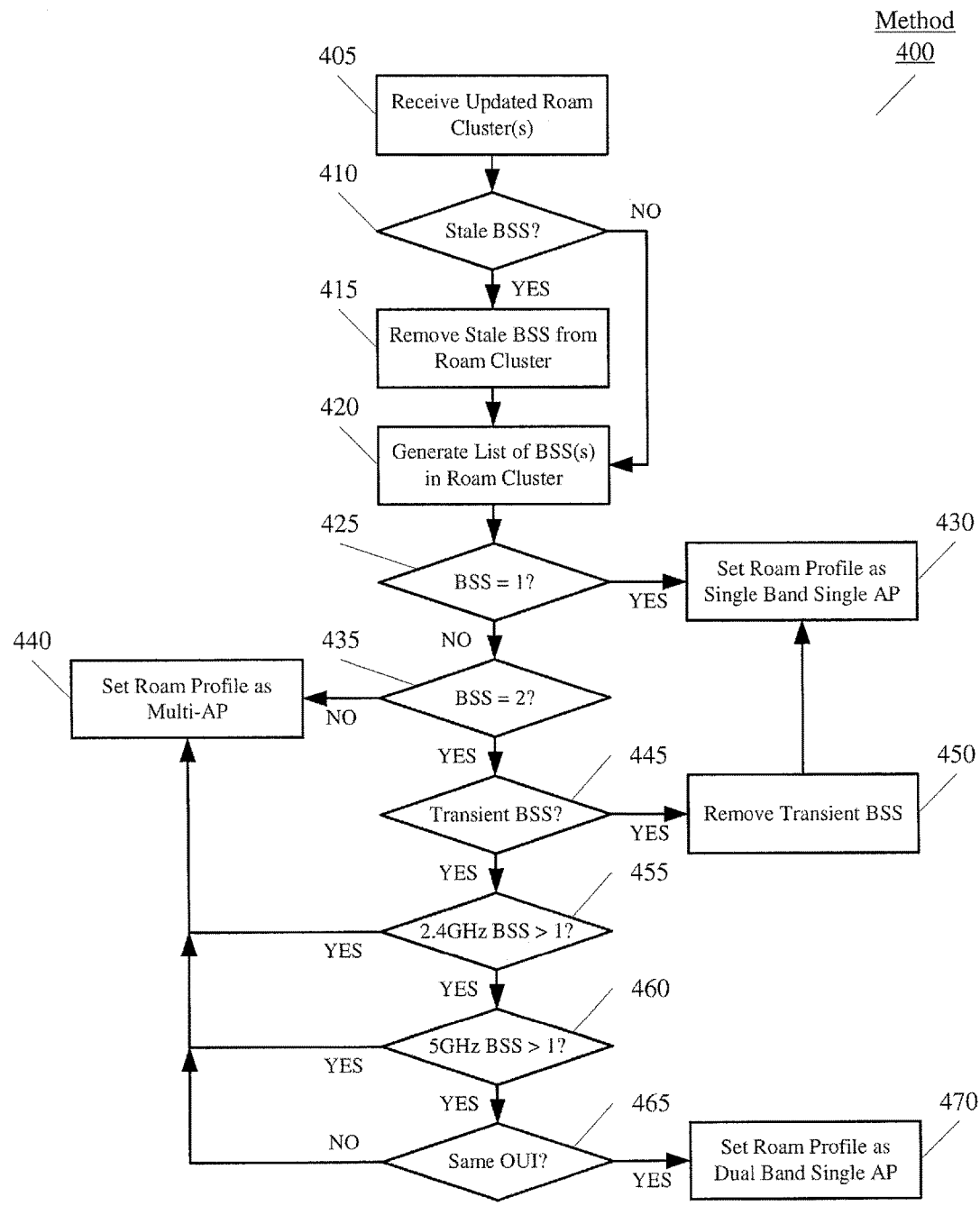
FIG. 4 shows an exemplary method of determining a roam profile for a roam cluster.

FIG. 4 shows an exemplary method 400 of determining a roam profile for a roam cluster. The method 400 may be a second portion of a process of updating and maintaining the roam database 240 including information of roam profiles for the areas in the network arrangement 100.

In step 405, the roam application 235 receives the updated roam clusters, specifically, the roam clusters that are updated from the method 300 being performed. The roam clusters include nodes that are new or updated and relate to a network that the station 200 joins for the predetermined join threshold value. As discussed above, the roam application 235 may remove stale nodes. Thus, in step 410, the roam application 235 determines whether an updated roam cluster includes a stale BSS. If there is a stale BSS, the roam application 235 further updates the roam cluster by removing the stale BSS in step 415. If there is no stale BSS or after the roam cluster is further updated from removing any stale BSS, the method 400 continues to step 420. In step 420, the roam application 235 generates a list of BSSs from the information included in the roam cluster. As discussed above, if the roam cluster is new for a BSS of an AP having a BSSID that are unknown, the list of BSSs include the single node representing this BSS. However, if the roam cluster exists or a roam event occurred, the list of BSSs may include more than one node representing a respective BSS. The roam application 235 may generate the list of BSSs relative to the area in which the station 200 may be located. Thus, if all the areas 120-170 of the network arrangement 100 of FIG. 1 were to be included into a roam cluster, the roam application 235 may determine the various BSSs to be included in each area. For example, in the area 135, the roam application 235 may determine the list of BSSs to include only the 2.4 GHz operating band for the AP 115. In another example, in the area 30, the roam application 235 may determine the list of BSSs to include the 2.4 GHz operating band for the AP 110 and the 5 GHz operating band for the AP 110. In a further example, in the area 165, the roam application 235 may determine the list of BSSs to include the 2.4 GHz operating band for the AP 110, the 2.4 GHz operating band of the AP 115, and the 5 GHz operating band of the AP 115.

In step 425, the roam application 235 determines whether the list of BSSs includes one BSS. If there is only one BSS, the method 400 continues to step 430. As discussed above, this scenario may apply when the area 135 is processed. In step 430, with only one BSS, the roam application 235 may set the roam profile as the SBSA roam profile.

If there is more than one BSS, the method 400 continues to step 435. In step 435, the roam application 235 determines whether the list of BSSs includes two BSSs. When the roam application 235 determines that the list of BSSs includes not one, not two, but more than two BSSs, the method 400 continues to step 440. As discussed above, this scenario may apply when the area 165 is processed. In step 440, three or more BSSs, the roam application 235 may set the roam profile as the multi-AP roam profile. In another example, when the area 170 is processed, the 2.4 GHz operating band for the AP 105, 110, 115 are included, thereby having this area set as the multi-AP roam profile.

Returning to step 435, if there are exactly two BSSs in the list of BSSs, the method 400 continues to step 445. In step 445, the roam application 235 determines whether one of the two BSSs is transient. The transient BSS may relate to a network that is decentralized, may not be a constant node of the network, and/or capable of joining or leaving the network at any time or at any place. For example, the transient BSS may be for a peer-to-peer connectivity. When a transient BSS is determined, the method 400 continues to step 450. In step 450, the transient BSS is removed from the list of BSSs. Accordingly, a single BSS remains within the list. Therefore, the method 400 continues to step 430 where the roam application 235 sets the roam profile as the SBSA roam profile.

If the roam application 235 determines that both BSSs in the list of BSSs are not transient but permanent nodes, the method 400 continues to step 455. In step 455, the roam application 235 determines whether there is more than one 2.4 GHz operating band. That is, the roam application 235 determines whether both BSSs are for two different 2.4 GHz operating bands. As an AP may only include a single 2.4 GHz operating band, this may form a basis to conclude that there must be two different APs in this area. Thus, when both BSSs are for two different 2.4 GHz operating bands, the method 400 continues to step 440 where the roam application 235 sets the roam profile for this area as the multi-AP roam profile. A substantially similar process may be performed for the 5 GHz operating band. In step 460, the roam application 235 determines whether there is more than one 5 GHz operating band. As an AP may only include a single 5 GHz operating band, this may also form a basis to conclude that there must be two different APs in this area. Thus, when both BSSs are for two different 5 GHz operating bands, the method 400 continues to step 440 where the roam application 235 sets the roam profile for this area as the multi-AP roam profile.

However, when there is one 2.4 GHz operating band and one 5 GHz operating band, the method 400 continues to step 465. In step 465, the roam application 235 may determine whether the Organizationally Unique Identifier (OUI) or other identifier of the AP providing the BSS in these operating bands is the same. For example, when the station 200 is in the area 160, the roam cluster may indicate that the 2.4 GHz operating band of the AP 115 and the 5 GHz operating band of the AP 110 may be included. However, there are clearly two different APs providing these networks. The roam application 235 may receive the OUI information to associate the network in the operating band. Thus, since the OUI of the AP providing the 2.4 GHz operating band network is different from the OUI of the AP providing the 5 GHz operating band network, the roam application 235 may determine that these are different APs. Accordingly, the method 400 continues to step 440 where the roam application 235 sets the roam profile for this area as the multi-AP roam profile. Those skilled in the art will understand that the OUI or any other identifier may be specific to the AP. For example, a 24-bit number may be assigned that no other AP may utilize.

If the roam application 235 determines that a common AP is providing the 2.4 Ghz operating band network and the 5 GHz operating band network since the same OUI is detected, the method 400 continues to step 470. In step 470, the roam application 235 sets the roam profile for this area as the DBSA roam profile. For example, if the station 200 is located in the area 130, the 2.4 GHz operating band network and the 5 GHz operating band network are both provided by the AP 110 which is a dual band AP. The roam application 235 is configured to eliminate the multi-AP roam profile from the above determination and conclude that the DBSA roam profile is proper.

It should be noted that when the multi-AP roam profile is set, the roam application 235 may further process the BSSs for the respective area to determine whether the area provides a DBSA environment as well. For example, in the area 165, the roam cluster may indicate that the 2.4 GHz operating band of the AP 110, the 2.4 GHz operating band of the AP 115, and the 5 GHz operating band of the AP 115 are all included. The roam application 235 may perform substantially similar steps to determine whether these networks are provided by a common AP such as using the OUI. The roam application 235 may therefore determine that the area 165 includes a DBSA roam profile from the 2.4 GHz operating band of the AP 115 and the 5 GHz operating band of the AP 115 as well as a SBSA roam profile from the 2.4 GHz operating band of the AP 110. However, in view of these combined networks, the multi-AP roam profile is still set with further identifications for the roam profiles provided by each AP included therein.

Once the roam clusters have been determined by being added or updated and the roam profiles have been determined for each area in the network arrangement 100 based upon the information included in the roam clusters, the roam application 235 is prepared to perform the opportunistic roams based upon the roam profiles. As discussed above, the roam application 235 may utilize the roam database 240 that includes the roam cluster and roam profile information. Within the same database or stored in a further database, the roam application 235 may also reference a set of configurations that are predetermined or that are set by a user for each type of roam profile. Thus, there may be a first set of configurations for the SBSA roam profile, a second set of configurations for the DBSA roam profile, and a third set of configurations for the multi-AP roam profile. The set of configurations may include a variety of information on the manner in which the roam application 235 is to perform the opportunistic roam.

FIG. 5A shows an exemplary set of configurations 500 used for roaming from a SBSA roam profile. The SBSA configurations 500 include various information on the manner in which an opportunistic roam is to be performed by the roam application 235 when the station 200 is located in an area with a SBSA roam profile, e.g., the areas 120, 125, 135 of the network arrangement 100 of FIG. 1.

The SBSA configurations 500 may include a variety of brackets for different parameters related to network connectivity. As illustrated in FIG. 5A, the SBSA configurations 500 includes a current band bracket measured in GHz; an RSSI bracket including an upper bound and a lower bound measured as a power ratio in decibels (dB) of the measured power referenced to one milliwatt (mW) (hereinafter "dBm"); a priority bracket; a scan bracket including a predetermined number of initial full roam scans (N), an initial time period (T1), a backoff period (p), a maximum time period (T2), and a full scan time period (T3); and a candidate bracket including a RSSI delta measured in dBm, a 2.4 GHz operating band sub-bracket including a boost RSSI measured in dBm and a boost delta measured in dBm, and a 5 Ghz operating band sub-bracket also including a boost RSSI measured in dBm and a boost delta measured in dBm.

The current band bracket may identify the operating band of the network that the station 200 is currently joined and further specifies the corresponding information in the brackets. Specifically with the SBSA roaming profile, the station 200 may either be joined to a network operating on the 2.4 GHz operating band or the 5 GHz operating band. The RSSI bracket may identify the upper and lower bounds for which the further brackets are used. As illustrated in FIG. 5A, the upper bound may be −75 dBm while the lower bound may be an undefined minimum RSSI value. Given this range of RSSI values, this may indicate when the signal strength experienced by the station 200 from being joined to the network having either the 2.4 GHz operating band or the 5 GHz operating band is poor. That is, the station 200 may be experiencing a low coverage scenario with the network. Accordingly, the priority bracket may be set to "high" for this particular set of circumstances.

As will be further described below, the priority bracket may also be set to "low". The exemplary manner of performing the opportunistic roam has different priorities for triggering at high and low measured RSSIs. That is, the high RSSI roam has a low priority while the low RSSI roam has a high priority. Those skilled in the art will understand that a relatively low RSSI roam is performed at a higher priority in order to maintain association to an AP while a relatively high RSSI roam is performed as a background activity without causing interruption to current data activity or events. High RSSI roams may also consider power consumption. For example, the set of configurations may specify manners for conserving power while still performing the high RSSI roams (having low priority). The set of configurations may be set using a variety of criteria, especially for a low priority roam. In a first example, the low priority roam may be restricted to only be performed when the station 200 is in a particular state. For example, the low priority roam may only be triggered after a transmission/reception idle period or no data indication from a data traffic indication message (DTIM). That is, the low priority roam may be triggered when the radio would otherwise go to sleep or hibernate. In a second example, the low priority roam may be deferred whenever a foreground activity is being performed by a user. That is, a user activity executed on the station 200 takes precedence over any low priority roam attempt. In a third example, the scans associated with a low priority roam may increase in time between scans to conserve power. In a fourth example, other full-band scans that are available may be utilized such that the station 200 itself is not required to perform the scan and further conserve power.

It should be noted that when the station 200 is located in an area having the SBSA roam profile, the upper bound of the RSSI bracket may indicate a predetermined minimum RSSI threshold value. Therefore, when the SBSA roam profile is below the upper bound identified in the SBSA configurations 500, the roam application 235 may perform a roam using the information included in the subsequent brackets. It should also be noted that when the station 200 is above the upper bound of the RSSI bracket, the station 200 may experience a medium to good coverage such that a roam may not be required to be performed. It is further noted that the upper bound value of −75 dBm is only exemplary and this value may be adjusted to any value that is considered appropriate to trigger the roam under the SBSA roam profile.

The scan bracket may indicate a manner in which a roam scan is to be performed for the opportunistic roam. For the specific case when the station 200 is located in an area having a SBSA roam profile, the scan bracket may provide a number of full roam scans N (indicated as 2) to be performed initially. The initial full roam scans may be performed based upon an initial time period T1 (indicated as 30 seconds). When roam candidates are found from the set number of initial full roam scans, from the next roam scan to be performed, a partial roam scan may be performed. The partial roam scan may be performed for channels in which roam candidates are identified from previous roam scans. Specifically, the partial roam scan may be done under the initial time period T1 and having a backoff period (indicated as 1) until a maximum full scan period T3 (indicated as 90 seconds). The backoff period p may be set to 1 that indicates the initial time period T1 is to be maintained during the full scan period T3. Since the station 200 is experiencing a low coverage from the network in the SBSA roam profile (e.g., within the upper and lower bounds specified in the RSSI bracket), the priority has been set to "high" for a relatively aggressive manner of determining a roam candidate. Thus, the time period may be maintained. However, as will be described in further detail below, the backoff period p may increase the time interval between roam scans, particularly when the priority is set to "low."

The full roam scan and the partial roam scan may be utilized by the roam application 235 to optimize a power consumption, particularly for low priority roams. As discussed above, an exemplary manner of setting when full roam scans are performed and when partial roam scans are performed may be determined from the scan periods. In a further exemplary manner, the initial full roam scans may be performed until N full roam scans are performed with an interval between roam scans being the time period T1. After N full roam scans are performed without a successful roam candidate being found, the roam application 235 may switch to the partial roam scan. The partial roam scan may initially be performed after the time period T1. A subsequent partial roam scan may be performed after an adjusted time period calculated from modifying the time period T1 with the backoff period p. For example and as will be described in further detail below, the time period T1 may be 3 minutes with a backoff period p being 3 minutes. Thus, a first subsequent partial roam scan may be performed after 6 minutes. A second subsequent partial roam scan may also be performed by modifying the adjusted time period by the backoff period p. Thus, the second subsequent partial roam scan may be performed after 9 minutes. This may continue until a maximum time interval T2 is reached. When the maximum time interval T2 is reached, the partial roam scans are performed at this time T2 without further modification. The roam application 235 may also determine when a time period T3 is reached such that a full roam scan may again be performed. The full roam scan being performed at a time T3 may be done to update the channel cache of identified roam candidates (operating at a corresponding channel).

It should be noted that the above manner of determining when to perform full and partial roam scans is only exemplary. In a first example, the interval T1 being adjusted by p until a maximum interval T2 is reached may be modified. For example, when the station 200 indicates movement or a change in environment, the scan interval may be reset back to T1 and proceed accordingly. In a second example, the intervals T1, T2, and T3 may be optional settings depending on the priority level. As illustrated in the high priority roam for the SBSA roaming profile, the backoff period p is set to 1 such that the time interval T2 has a null value. That is, the time interval between full and partial roam scans remain at the initial time period T1.

The candidate bracket may indicate a manner of adjusting RSSI values of roam candidates and to indicate a minimum delta threshold value that the roam candidate must exceed for the roam candidate to be selected. The RSSI delta may be a minimum comparative threshold value that must be satisfied for the roam application 235 to select a roam candidate AP. Specifically, the minimum comparative threshold value may be a comparison between the RSSI value corresponding to the currently associated AP and a RSSI value corresponding to a roam candidate AP. Although the minimum comparative threshold value may be set to be an absolute minimum (e.g., any positive value), to ensure that the opportunistic roam provides an improved connectivity, the minimum comparative threshold value may be required to be above, for example, 12 dBm in the case where the station 200 is in an area having the SBSA roaming profile.

The boost RSSI may be a minimum RSSI value that the roam candidate AP must satisfy in order for the boost delta is applied. The boost delta is a predetermined value that is added to the RSSI value of the roam candidate AP to improve a probability that the opportunistic roam is to occur. As illustrated in the SBSA configurations 500, any roam candidate AP having a network in the 2.4 GHz operating band is not given a boost delta under any condition. However, any roam candidate having a network in the 5 GHz operating band and having a minimum RSSI value of −65 dBm is given a +50 dBm boost. For example, if the RSSI value for a roam candidate AP having a network in the 5 GHz operating band is −60 dBm, the RSSI value used in the RSSI delta is −10 dBm. If the RSSI value for a currently associated AP is −80 dBm, the difference in value is +70 dBm (−10 dBm−(−80 dBm)=+70 dBm) which satisfies the RSSI delta, thereby the roam application 235 selecting this roam candidate AP for an opportunistic roam.

The boost RSSI and the boost delta in the candidate bracket may be set specifically to improve a likelihood that the opportunistic roam is to be performed, particularly when the priority value is set to "high." By padding the RSSI value of a roam candidate AP, the RSSI delta may be satisfied even when actual values of RSSI would normally not satisfy the RSSI delta. For example, with the RSSI delta at +12 dBm, a roam candidate AP may have a RSSI value of −60 dBm while the currently associated AP may have a RSSI value of −70 dBm. The resulting RSSI delta would normally be calculated as +10 dBm in this case. However, if the set of configurations indicate that the roam candidate AP is to receive a +10 dBm boost, the value used in the RSSI delta for the roam candidate AP is −50 dBm. Therefore, the RSSI delta results in +20 dBm which satisfies the RSSI delta.

It should be noted that all values describes above for each bracket is only exemplary. Those skilled in the art will understand that any value may be used such that the opportunistic roam functionality is performed by the roam application 235. It should also be noted that the values of each bracket may be selected so that a legacy roam functionality may be preserved and also utilized by the roam application 235 when conditions are present that would ordinarily trigger this legacy roam functionality. Since the roam application 235 is configured to perform the opportunistic roam functionality, the set of configurations may relate to conditions that may exist before the legacy roam functionality is triggered.

It should also be noted that the brackets illustrated in the SBSA configurations 500 is only exemplary. The set of configurations may include further brackets that may encompass other scenarios. For example, the RSSI bracket for upper and lower bounds may include a first range for good coverage, a second range for medium coverage, and a third range for low coverage. As shown in the SBSA configurations 500, only the low coverage is shown as the upper bound is set to −75 dBm while the lower bound is set to any minimum value less than −75 dBm. The SBSA configurations 500 may further include a medium coverage range in which the lower bound is set at −75 dBm with an upper bound set to, for example, −50 dBm. The good coverage and medium coverage may be supplemented to the SBSA configurations 500 by including further rows therein. Accordingly, values may be set for the remaining brackets. In another example, the RSSI bracket may be subdivided into three categories such as upper, medium, and lower. This subdivision may provide a substantially similar feature as providing the good, medium, and low coverage. However, this modification may entail including a further column in the SBSA configurations 500. Therefore, the set of configurations may be modified through addition/deletion of rows and/or columns.

FIG. 5B shows an exemplary set of configurations 505 used for roaming from a DBSA roam profile. The DBSA configurations 505 may also include similar brackets as the SBSA configurations 500. Specifically, the DBSA configurations 505 include the current band bracket, the RSSI bracket, the priority bracket, the scan bracket, and the candidate bracket.

As illustrated in the DBSA configurations 505, the current band bracket may include three scenarios. As with the SBSA configurations 500, the DBSA configurations 505 relate to when the area in which the station 200 is located has a DBSA roaming profile such as the areas 130, 140. As discussed above, the area 130 includes the 2.4 GHz and the 5 GHz operating band of the AP 110 while the area 140 includes the 2.4 GHz and the 5 GHz operating band of the AP 115. It is noted that no other network is available in these areas other than those listed above.

In a first scenario, the station 200 may be joined to a BSS of an AP having a BSSID operating in the 2.4 GHz operating band and having a low priority in which the upper bound of the RSSI bracket is any value greater than the lower bound and a lower bound of the RSSI bracket of −75 dBm. When this set of circumstances exist, the DBSA configurations 505 may indicate that the number of initial full roam scans N to be performed is set to 2 having an initial time period T1 of 3 minutes, a backoff period p of 2, a maximum time period T2 of 24 minutes, and a full scan time period T3 of 48 minutes. In this manner, the roam application 235 first performs full roam scans when the station 200 is within the RSSI bounds with a time interval between scans at T1 or 3 minutes. After the initial full roam scans N, the roam application 235 may perform a partial roam scan in which each partial roam scan is performed with the backoff period p applied (e.g., 3 minutes). Thus, each subsequent partial roam scan is performed at T1+3(x), x being the number of partial roam scans performed. Once the value of T1+3(x) reaches T2 or 24 minutes, each partial roam scan is performed at T2 or 24 minutes. However, every time the full scan time period T3 is reached, the roam application 235 performs a full roam scan to refresh the channel cache. When this set of circumstances exist, the DBSA configurations 505 may also indicate that the RSSI delta is set to +20 dBm. Any roam candidate AP having the 2.4 GHz operating band may not be given any boost delta while any roam candidate AP having the 5 GHz operating band may be given a boost delta of +30 dBm when the boost RSSI minimum value is at least −65 dBm.

In a second scenario, the station 200 may be joined to a BSS of an AP having a BSSID operating in the 2.4 GHz operating band and having a high priority in which the upper bound is set to −75 dBm and a lower bound of any value less than the upper bound. When this set of circumstances exist, the DBSA configurations 505 may indicate that the number of initial full roam scans N to be performed is set to 2 having an initial time period T1 of 30 seconds, a backoff period p of 1, and a full scan time period T3 of 90 seconds. In this manner, the roam application 235 first performs full roam scans when the station 200 is within the RSSI bounds with a time interval between scans at T1 or 30 seconds. After the initial full roam scans N, the roam application 235 may perform a partial roam scan in which each partial roam scan is performed with the backoff period p applied (e.g., 0). Thus, each subsequent partial roam scan is performed at T1. Every time the full scan time period T3 is reached, the roam application 235 performs a full roam scan to refresh the channel cache. When this set of circumstances exist, the DBSA configurations 505 may also indicate that the RSSI delta is set to +12 dBm. Any roam candidate AP having the 2.4 GHz operating band may not be given any boost delta while any roam candidate AP having the 5 GHz operating band may be given a boost delta of +50 dBm when the boost RSSI minimum value is at least −65 dBm.

In a third scenario, the station 200 may be joined to a BSS of an AP having a BSSID operating in the 5 GHz operating band and having a high priority in which the upper bound is set to −75 dBm and a lower bound of any value less than the upper bound. When this set of circumstances exist, the DBSA configurations 505 may indicate that the number of initial full roam scans N to be performed is set to 2 having an initial time period T1 of 30 seconds, a backoff period p of 1, and a full scan time period T3 of 90 seconds. In this manner, the roam application 235 first performs full roam scans when the station 200 is within the RSSI bounds with a time interval between scans at T1 or 30 seconds. After the initial full roam scans N, the roam application 235 may perform a partial roam scan in which each partial roam scan is performed with the backoff period p applied (e.g., 0). Thus, each subsequent partial roam scan is performed at T1. Every time the full scan time period T3 is reached, the roam application 235 performs a full roam scan to refresh the channel cache. When this set of circumstances exist, the DBSA configurations 505 may also indicate that the RSSI delta is set to +12 dBm. Any roam candidate AP having the 2.4 GHz operating band may not be given any boost delta while any roam candidate AP having the 5 GHz operating band may be given a boost delta of +50 dBm when the boost RSSI minimum value is at least −65 dBm.

FIG. 5C shows an exemplary set of configurations 510 used for roaming from a multi-AP roam profile. The multi-AP configurations 510 may also include similar brackets as the SBSA configurations 500 and the DBSA configurations 510. Specifically, the multi-AP configurations 510 include the current band bracket, the RSSI bracket, the priority bracket, the scan bracket, and the candidate bracket.

As illustrated in the multi-AP configurations 510, the current band bracket may include four scenarios. As with the SBSA configurations 500 and the DMA configurations 505, the multi-AP configurations 510 relate to when the area in which the station 200 is located has a multi-AP roaming profile such as the areas 145-170.

In a first scenario, the station 200 may be joined to a BSS of an AP having a BSSID operating in the 2.4 GHz operating band and having a low priority in which the upper bound of the RSSI bracket is any value greater than the lower bound and a lower bound of the RSSI bracket of −50 dBm. When this set of circumstances exist, the multi-AP configurations 510 may indicate that the number of initial full roam scans N to be performed is set to 2 having an initial time period T1 of 3 minutes, a backoff period p of 2, a maximum time period T2 of 12 minutes, and a full scan time period T3 of 24 minutes. In this manner, the roam application 235 first performs full roam scans when the station 200 is within the RSSI bounds with a time interval between scans at T1 or 3 minutes. After the initial full roam scans N, the roam application 235 may perform a partial roam scan in which each partial roam scan is performed with the backoff period p applied (e.g., 3 minutes). Thus, each subsequent partial roam scan is performed at T1+3(x), x being the number of partial roam scans performed. Once the value of T1+3(x) reaches T2 or 12 minutes, each partial roam scan is performed at T2 or 12 minutes. However, every time the full scan time period T3 is reached, the roam application 235 performs a full roam scan to refresh the channel cache. When this set of circumstances exist, the multi-AP configurations 510 may also indicate that the RSSI delta is set to +20 dBm. Any roam candidate AP having the 2.4 GHz operating band may not be given any boost delta while any roam candidate AP having the 5 GHz operating band may be given a boost delta of +50 dBm when the boost RSSI minimum value is at least −65 dBm.

In a second scenario, the station 200 may be joined to a BSS of an AP having a BSSID operating in the 2.4 GHz or 5 GHz operating band and having a low priority in which the upper bound of the RSSI bracket is −50 dBm and a lower bound of the RSSI bracket of −70 dBm. When this set of circumstances exist, the multi-AP configurations 510 may indicate that the number of initial full roam scans N to be performed is set to 2 having an initial time period T1 of 3 minutes, a backoff period p of 1, and a full scan time period T3 of 9 minutes. In this manner, the roam application 235 first performs full roam scans when the station 200 is within the RSSI bounds with a time interval between scans at T1 or 3 minutes. After the initial full roam scans N, the roam application 235 may perform a partial roam scan in which each partial roam scan is performed with the backoff period p applied (e.g., 0). Thus, each subsequent partial roam scan is performed at T1. Every time the full scan time period T3 is reached, the roam application 235 performs a full roam scan to refresh the channel cache. When this set of circumstances exist, the multi-AP configurations 510 may also indicate that the RSSI delta is set to +15 dBm. Any roam candidate AP having the 2.4 GHz operating band may not be given any boost delta while any roam candidate AP having the 5 GHz operating band may be given a boost delta of +50 dBm when the boost RSSI minimum value is at least −65 dBm.

In a third scenario, the station 200 may be joined to a BSS of an AP having a BSSID operating in the 2.4 GHz operating band and having a high priority in which the upper bound is set to −70 dBm and a lower bound of any value less than the upper bound. When this set of circumstances exist, the multi-AP configurations 510 may indicate that the number of initial full roam scans to be performed N is set to 2 having an initial time period T1 of 30 seconds, a backoff period p of 1, and a full scan time period T3 of 90 seconds. In this manner, the roam application 235 first performs full roam scans when the station 200 is within the RSSI bounds with a time interval between scans at T1 or 30 seconds. After the initial full roam scans N, the roam application 235 may perform a partial roam scan in which each partial roam scan is performed with the backoff period p applied (e.g., 0). Thus, each subsequent partial roam scan is performed at T1. Every time the full scan time period T3 is reached, the roam application 235 performs a full roam scan to refresh the channel cache. When this set of circumstances exist, the multi-AP configurations 510 may also indicate that the RSSI delta is set to +12 dBm. Any roam candidate AP having the 2.4 GHz operating band may not be given any boost delta while any roam candidate AP having the 5 GHz operating band may be given a boost delta of +50 dBm when the boost RSSI minimum value is at least −65 dBm.

In a fourth scenario, the station 200 may be joined to a BSS of an AP having a BSSID operating in the 5 GHz operating band and having a high priority in which the upper bound is set to −70 dBm and a lower bound of any value less than the upper bound. When this set of circumstances exist, the multi-AP configurations 510 may indicate that the number of initial full roam scans to be performed N is set to 2 having an initial time period T1 of 30 seconds, a backoff period p of 1, and a full scan time period T3 of 90 seconds. In this manner, the roam application 235 first performs full roam scans when the station 200 is within the RSSI bounds with a time interval between scans at T1 or 30 seconds. After the initial full roam scans N, the roam application 235 may perform a partial roam scan in which each partial roam scan is performed with the backoff period p applied (e.g., 0). Thus, each subsequent partial roam scan is performed at T1. Every time the full scan time period T3 is reached, the roam application 235 performs a full roam scan to refresh the channel cache. When this set of circumstances exist, the multi-AP configurations 510 may also indicate that the RSSI delta is set to +12 dBm. Any roam candidate AP having the 2.4 GHz operating band may be given a boost delta of +10 dBm for any boost RSSI value while any roam candidate AP having the 5 GHz operating band may be given a boost delta of +50 dBm when the boost RSSI minimum value is at least −65 dBm.

Figure 6:
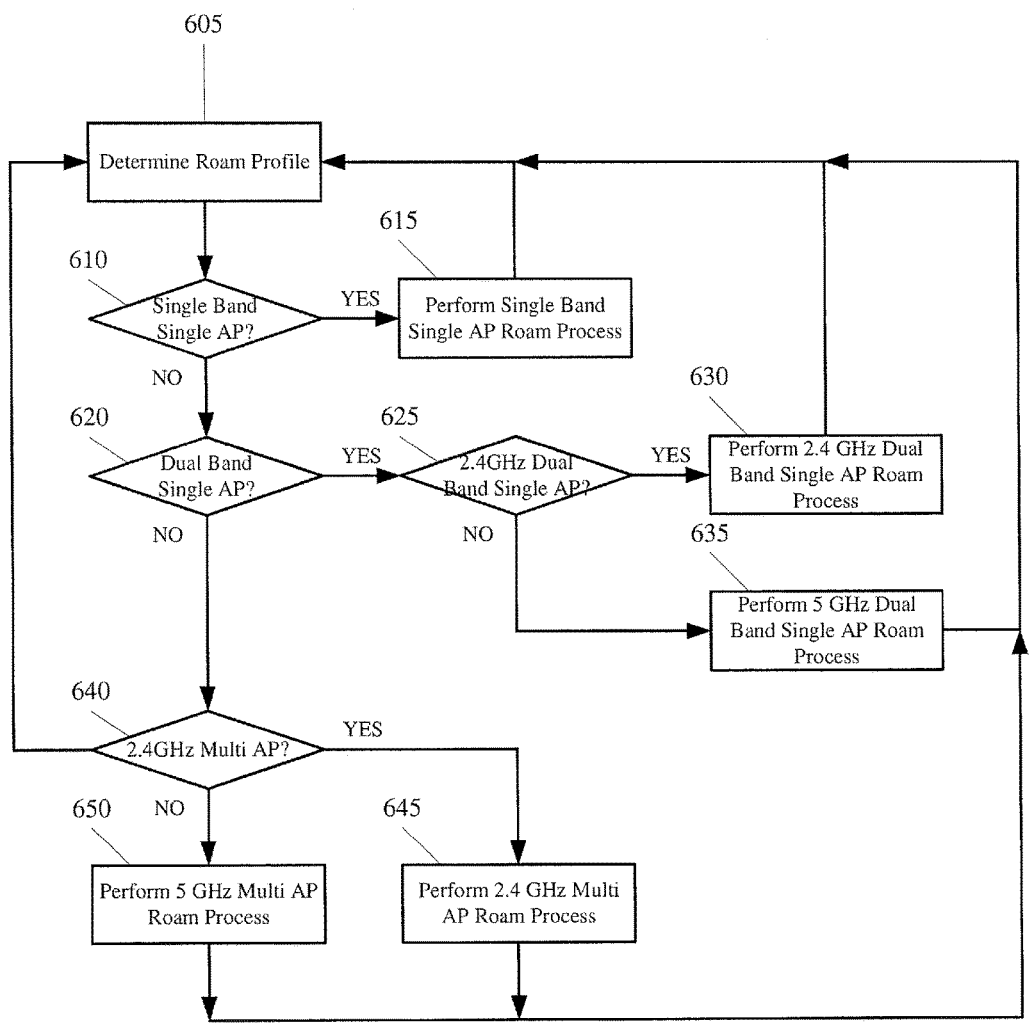
FIG. 6 shows an exemplary overall method of determining a manner for opportunistic roaming.

FIG. 6 shows an exemplary overall method 600 of determining a manner for opportunistic roaming. The method 600 relates to the roam application 235 utilizing the roam database 240 including areas identified by a roam profile based upon roam clusters that are determined. It should be noted that the method 600 may assume that the roam database 240 has been generated, the roam profile of the area in which the station 200 is located has been identified, and/or interconnections indicating potential roam candidates have been identified.

In step 605, the roam application 235 determines the roam profile of the area that the station 200 is located. For example, when in the areas 120, 125, 135, the roam profile may be identified as the SBSA roam profile. In another example, when in the areas 130, 140, the roam profile may be identified as the DBSA roam profile. In a further example, when in the areas 145-170, the roam profile may be identified as the multi-AP roam profile.

In step 610, the roam application 235 determines whether the roam profile is the SBSA roam profile. If the station 200 is in an area having the SBSA roam profile, the method 600 continues to step 615. In step 615, the roam application 235 performs the SBSA roam process based upon the SBSA configurations 500. After the SBSA roam process is performed in step 615, the method 600 returns to step 605. As the roam may have resulted in the station 200 being in an area having a different roam profile, the method 600 may repeat during the time that the station 200 is in use.

Returning to step 610, if the roam profile is not the SBSA roam profile, the method 600 continues to step 620. In step 620, the roam application 235 determines whether the roam profile is the DBSA roam profile. If the station is in an area having the DBSA roam profile, the method 600 continues to step 625. In step 625, the roam application 235 determines whether the station 200 is currently joined to a network in the 2.4 Ghz operating band. If the station 200 is in a network in the 2.4 GHz operating band, the method 600 continues to step 630. In step 630, the roam application 235 performs the 2.4 Ghz DBSA roam process based upon the DBSA configurations 505. However, if the station is in a network in the 5 GHz operating band, the method 600 continues from step 625 to step 635. In step 635, the roam application 235 performs the 5 GHz DBSA roam process based upon the DBSA configurations 505. After the DBSA roam process is performed in either step 630 or 635, the method 600 returns to step 605.

Returning to step 620, if the roam profile is not the SBSA roam profile or the DBSA roam profile, the method 600 continues to step 640. At this point, the roam application 235 determines that the roam profile is the multi-AP roam profile. In step 640, the roam application 235 determines whether the station 200 is currently joined to a network in the 2.4 Ghz operating band. If the station 200 is in a network in the 2.4 GHz operating band, the method 600 continues to step 645. In step 645, the roam application 235 performs the 2.4 Ghz multi-AP roam process based upon the multi-AP configurations 510. However, if the station is in a network in the 5 GHz operating band, the method 600 continues from step 640 to step 650. In step 650, the roam application 235 performs the 5 GHz multi-AP roam process based upon the multi-AP configurations 510. After the multi-AP roam process is performed in either step 645 or 650, the method 600 returns to step 605.

Figure 7:
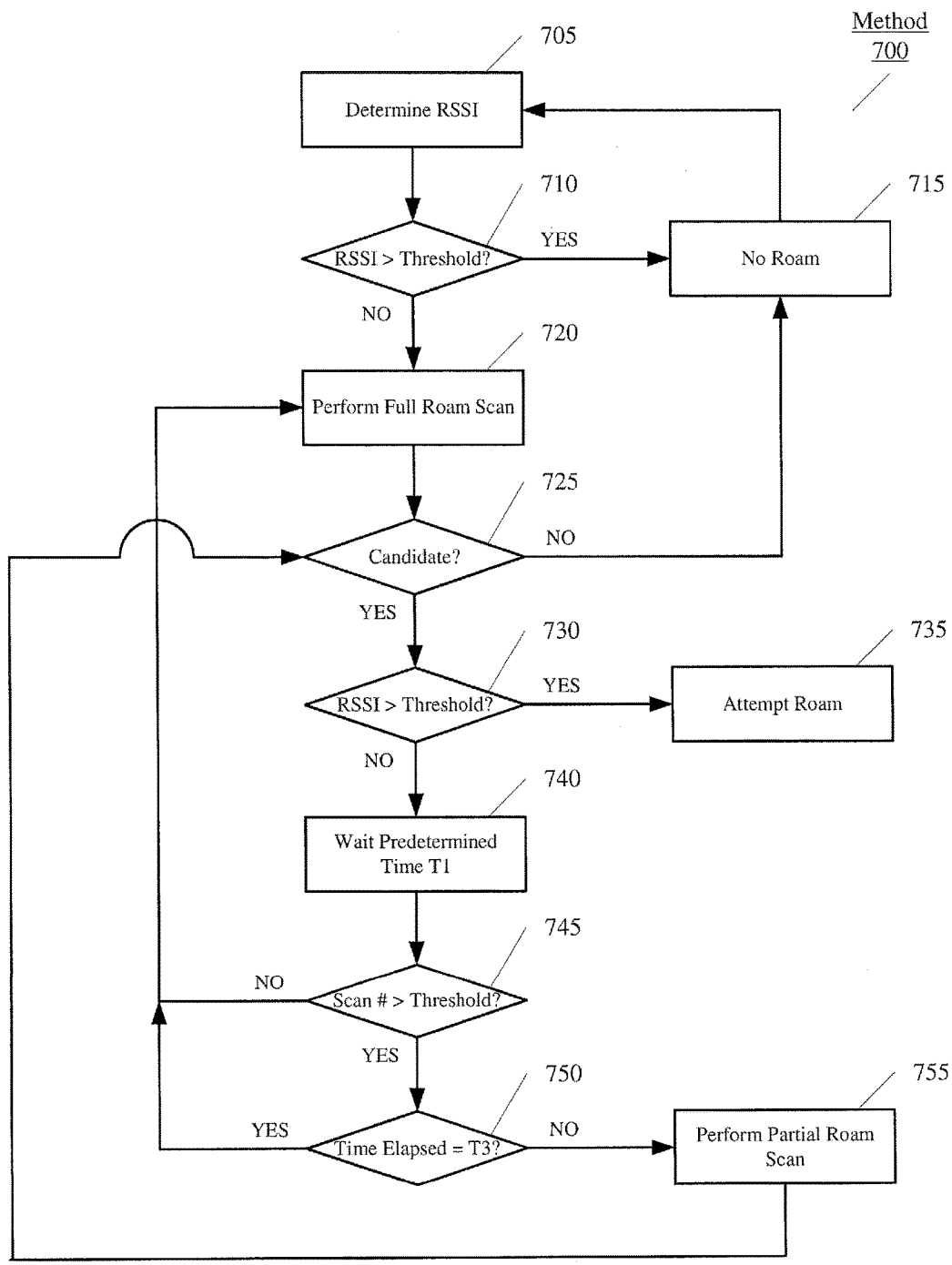
FIG. 7 shows an exemplary method for an opportunistic roam having a single band single AP roaming profile.

FIG. 7 shows an exemplary method 700 for an opportunistic roam having a SBSA roaming profile. Specifically, the exemplary method 700 may be for the SBSA roam process determined in step 615 of the method 600 of FIG. 6. As discussed above, the SBSA roam process may be performed based upon the roam database 240 that includes the SBSA configurations 500. Also as discussed above, the SBSA roam process may be performed based upon all or select brackets of the SBSA configurations 500. For example, the method 700 will be described with regard to including the initial full roam scans N. As will be described in further detail below, the SBSA roam process may be triggered when the station 200 is in low coverage to determine a potential roam candidate AP.

In step 705, the roam application 235 determines the RSSI value with the currently associated AP. Again, the network the station 200 is joined may have a 2.4 Ghz or 5 GHz operating band. In step 710, the roam application 235 determines whether the RSSI value with the currently associated AP is above the upper bound of the RSSI bracket in the SBSA configurations 500. If the RSSI value is greater, the method 700 continues to step 715 in which no roam is performed. Since the current connection to the network has a good coverage, the station 200 may exchange data in a sufficient manner that an opportunistic roam may not be preferred. Subsequently, the method 700 returns to step 705.

It should be noted that the roam application 235 not performing a roam is only exemplary. When the RSSI value to the currently associated AP is greater than the upper bound of the RSSI bracket, the SBSA configurations may include a low priority condition in which an opportunistic roam is still performed. For example, if the RSSI bracket indicates that the upper bound is −50 dBm with the lower bound being −75 dBm and the RSSI value is within this range, a low priority opportunistic roam may still be performed if indicated in the SBSA configurations 500.

Returning to step 710, if the RSSI value to the currently associated AP is within the upper and lower bounds of the RSSI bracket (e.g., lower than the upper bound of −75 dBm), the method 700 continues to step 720. In step 720, the roam application 235 performs a full roam scan. As described above, the full roam scan may be performed across all available channels. As indicated in the SBSA configurations 500, such a scenario indicates a high priority and the first of the number of initial scans N is performed. In step 725, the roam application 235 determines whether any roam candidate APs are available based upon the full roam scan. If no candidates are available, the method 700 continues to step 715. It should be noted that if the RSSI value is low enough but still within the lower bound of the RSSI bracket, the legacy roam functionality may still be triggered.

If candidates are identified in step 725, the method 700 continues to step 730. In step 730, the roam application 235 determines whether any of the candidates have a RSSI value that is greater than a predetermined threshold. Specifically, the roam application 235 determines the RSSI delta between the RSSI value for the currently associated AP and the RSSI value for the roam candidate AP. As indicated in the SBSA configurations 500, the RSSI delta may be at least +12 dBm. Again, if a 5 GHz roam candidate AP is identified, the boost delta of +50 dBm may be applied. If a qualified roam candidate AP is found, the method 700 continues to step 735 in which an opportunistic roam attempt is performed for the qualified roam candidate AP.

If no candidate AP satisfies the conditions specified in the SBSA configurations 500, the method 700 continues to step 740. In step 740, the roam application 235 waits the initial time period T1 for a subsequent roam scan to be performed. In step 745, the roam application 235 determines whether the number of initial full roam scans N have been performed. If the number of full roam scans performed at this point is less than the number N, the method 700 returns to step 720 for a subsequent full roam scan to be performed. However, if the number of full roam scans has already exceeded the number N, the method 700 continues to step 750. In step 750, the roam application 235 determines whether the time elapsed from the first initial full roam scan is at the time period T3 of 90 seconds. If the time elapsed is T3, the method 700 returns to step 720 for a full roam scan to be performed. In this manner, the channel cache may be refreshed. However, if the time elapsed is not T3, the method 700 continues to step 755 in which a partial roam scan is performed. As described above, the partial roam scan may be channels corresponding to any roam candidate AP that has been identified from previous roam scans. Subsequently, the method 700 returns to step 725 to assess the candidates again.

It should be noted that after step 735 when the opportunistic roam attempt is performed and a successful roam occurs, as indicated in the method 600 of FIG. 6, the roam application 235 may determine the roam profile for the station 200. Since the roam may have results in a change of roam profile, the roam application 235 may continue to perform opportunistic roams as a function of the roam profile while the station 200 is still in use.

Figure 8:
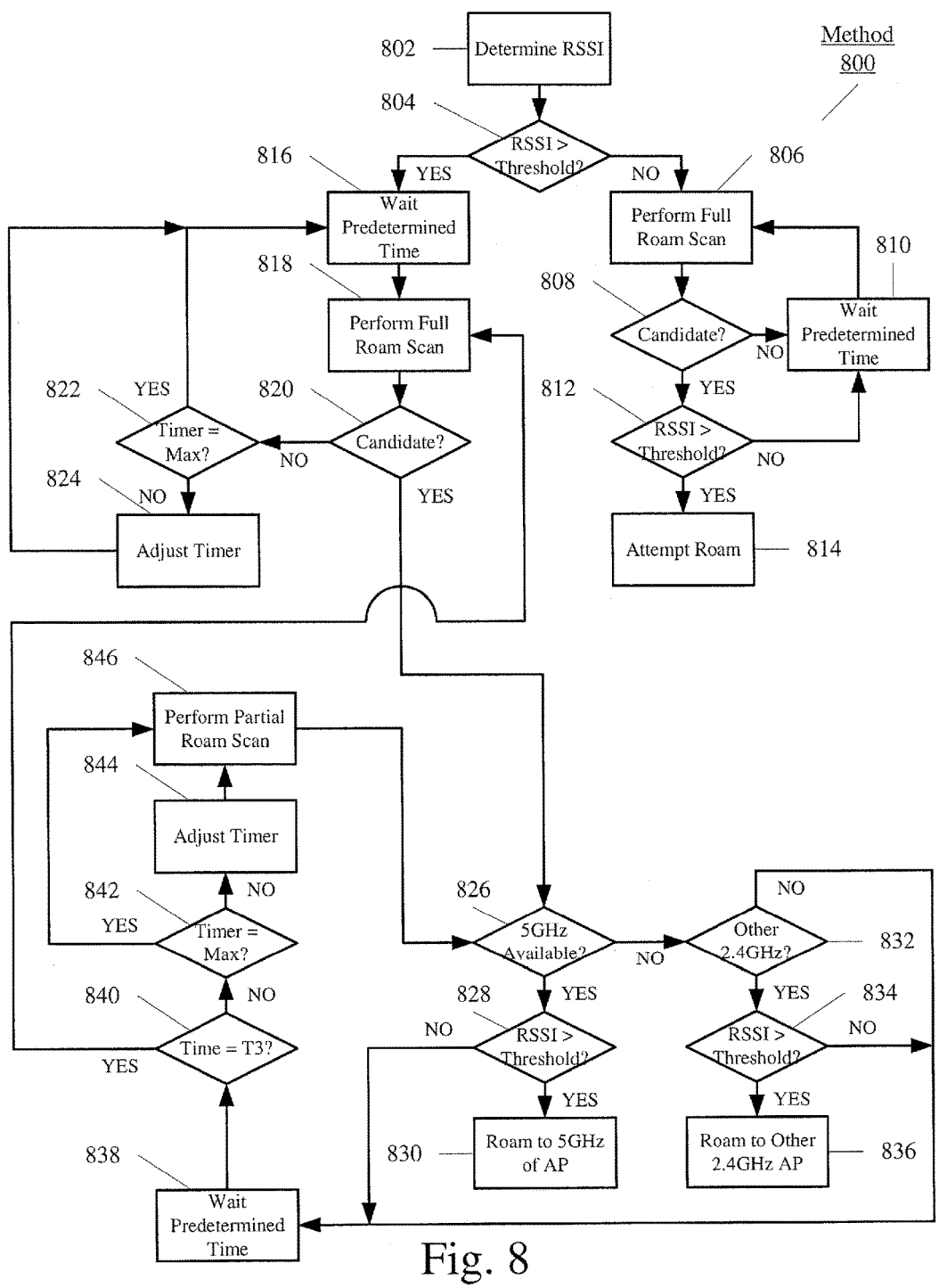
FIG. 8 shows an exemplary method for an opportunistic roam having a dual band single AP roaming profile at the 2.4 GHz operating band.

FIG. 8 shows an exemplary method 800 for an opportunistic roam having a DBSA roaming profile at the 2.4 GHz operating band. Specifically, the exemplary method 800 may be for the 2.4 GHz DBSA roam process determined in step 630 of the method 600 of FIG. 6. As discussed above, the DBSA roam process may be performed based upon the roam database 240 that includes the DBSA configurations 505. Also as discussed above, the DBSA roam process may be performed based upon all or select brackets of the DBSA configurations 505. For example, the method 800 will be described with regard to omitting the initial full roam scans N. As will be described in further detail below, the DBSA roam process may be triggered to look for the 5 GHz operating band at a low priority when in good coverage.

In step 802, the roam application 235 determines the RSSI value for the currently associated AP. Again, the network that the station 200 is currently joined may be with an AP that provides both the 2.4 GHz and 5 GHz operating bands and the station 200 is currently joined to the BSS for the 2.4 GHz operating band. In step 804, the roam application 235 determines whether the RSSI value is less than the upper bound of the RSSI bracket having the high priority or greater than the lower bound of the RSSI bracket having the low priority as indicated in the DBSA configurations 505.

If the RSSI value is within the range between the upper bound of −75 dBm and the lower bound of the RSSI bracket for the 2.4 GHz operating band and has a high priority, the method 800 continues to step 806. In step 806, the roam application 235 performs a full roam scan across all available channels. In step 808, the roam application 235 determines whether any roam candidate APs are available. If no candidate APs are found, the method 800 continues to step 810 where the roam application 235 waits the predetermined time indicated from the time period T1 of 30 seconds. The method 800 returns to step 806 for a full roam scan to be performed.

If roam candidate APs are found, the method 800 continues to step 812. In step 812, the roam application 235 determines whether the RSSI for the roam candidate APs results in a RSSI delta compared to the currently associated AP that is greater than the RSSI delta of +12 dBm indicated in the DBSA configurations 505. If no roam candidate AP satisfies this criteria, the method 800 returns to step 810 for the roam application 235 to wait the time period T1 of 30 seconds. However, if a roam candidate AP qualifies, the method 800 continues to step 814 to perform the opportunistic roam.

It should be noted that steps 806-814 may be performed in which values in the DBSA configurations 505 are not utilized. For example, although the DBSA configurations 505 provide a full scan period T3 in which a full roam scan is to be performed from having partial roam scans performed in order to refresh the channel cache, the above described manner does not incorporate such a feature of partial roam scans. However, the method 800 may include these steps to be performed for when the RSSI value is within the upper and lower bounds of the RSSI bracket for the 2.4 GHz operating band having the high priority (as determined in step 804).

Returning to step 804, if the RSSI value is within the upper and lower bounds of the RSSI bracket having the low priority, the method 800 continues to step 816. In step 816, the roam application 235 may wait the time period T1 of 3 minutes. Since this set of conditions indicates a low priority, the roam application 235 may not trigger the full roam scan immediately. In step 818, the roam application 235 performs the full roam scan across all available channels. In step 820, the roam application 235 determines whether any roam candidate APs are found. If no candidate is found, the method 800 continues to step 822. In step 822, the roam application 235 determines whether the timer is maximized. That is, the roam application 235 determines whether the interval between roam scans has been set to the time period T2 of 24 minutes. If the timer is not maximized, the method 800 continues to step 824 to adjust the timer by the backoff period p such as adding 3 minutes to the current timer value. If the timer is maximized or if the timer is adjusted, the method 800 returns to step 816 for the roam application 235 to wait the time period. At this point, the time period is an adjustment of the time period T1.

Returning to step 820, if roam candidate APs are found, the method 800 continues to step 826. In step 826, the roam application 235 determines whether any 5 GHz operating band is found, particularly for the currently associated AP. If the network with the 5 GHz operating band is among the roam candidate APs, the method 800 continues to step 828. In step 828, the roam application 235 determines whether the network in the 5 GHz operating band has a RSSI delta that results in the RSSI delta to be greater than the minimum RSSI delta of 20 dBm. As described above, the identified network in the 5 GHz operating band having a boost RSSI value of over −65 dBm may be boosted by the boost delta of +30 dBm as indicated in the DBSA configurations 505. If the RSSI delta is greater than +20 dBm, the method 800 continues to step 830 in which the roam application 235 roams to join the BSS of the 5 GHz operating band of the AP. It should be noted that there is a high probability that the network in the 5 GHz operating band is the same AP that the station 200 is currently joined in the 2.4 GHz operating band. If the RSSI delta is not greater than +20 dBm, the method 800 continues to step 838. Step 838 will be discussed below.

Returning to step 826, if a network in the 5 GHz operating band is not identified, the method 800 continues to step 832. In step 832, the roam application 235 determines whether any other networks in the 2.4 GHz operating band are in the roam candidate APs. If the roam candidate APs include networks in the 2.4 GHz operating band, the method 800 continues to step 834. In step 834, the roam application 235 determines whether the resulting RSSI delta is greater than +20 dBm. If the roam candidate AP satisfies criteria, the method 800 continues to step 836 to roam to the network having the 2.4 Ghz operating band which provides a better connectivity than the currently associated BSS of the AP in the 2.4 GHz operating band.

If no roam candidate APs in the 2.4 GHz operating band are found in step 832 or the roam candidate APs do not satisfy the RSSI delta as determined in step 834, the method 800 continues to step 838. In step 838, the roam application 235 waits the time period that is either the time period T1 or an adjusted value thereof. In step 840, the roam application 235 determines whether the time since the first initial full roam scan has been performed has reached the full scan time period T3 of 48 minutes. If the time period T3 has been reached, the method 800 returns to step 818 to perform a full roam scan in order to refresh the channel cache.

If the time period T3 has not been reached, the method 800 continues to step 842. In step 842, the roam application 235 determines whether the time period between roam scans has reached the maximum time period T2 of 24 minutes. If this time period T2 has already been reached for the timer, the method 800 continues to step 846. Step 846 will be described below. If the time period T2 has not been reached for the timer, the method 800 continues to step 844. In step 844, the roam application 235 adjusts the timer by the backoff period p. In step 846, the roam application 235 performs the partial roam scan across the channels corresponding to the roam candidate APs that have been found from previous roam scans. Subsequently, the method 800 returns to step 826.

It should be noted that after steps 830 or 838 when the opportunistic roam attempt is performed and a successful roam occurs, as indicated in the method 600 of FIG. 6, the roam application 235 may determine the roam profile for the station 200. Since the roam may have results in a change of roam profile, the roam application 235 may continue to perform opportunistic roams as a function of the roam profile while the station 200 is still in use.

Figure 9:
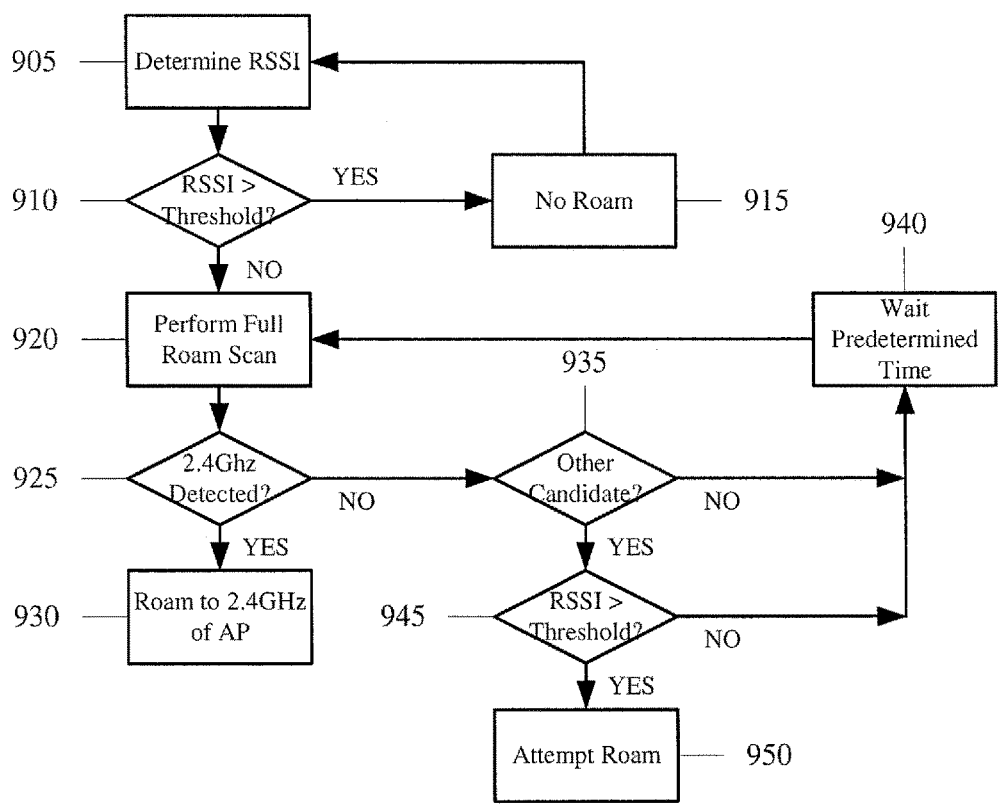
FIG. 9 shows an exemplary method for an opportunistic roam having a dual band single AP roaming profile at the 5 GHz operating band.

FIG. 9 shows an exemplary method 900 for an opportunistic roam having a DBSA roaming profile at the 5 GHz operating band. Specifically, the exemplary method 900 may be for the 5 GHz DBSA roam process determined in step 635 of the method 600 of FIG. 6. As discussed above, the DBSA roam process may be performed based upon the roam database 240 that includes the DBSA configurations 505. Also as discussed above, the DBSA roam process may be performed based upon all or select brackets of the DBSA configurations 505. For example, the method 900 will be described with regard to omitting the initial full roam scans N. As will be described in further detail below, the DBSA roam process may be triggered when the station 200 is in low coverage to determine a potential roam candidate AP.

In step 905, the roam application 235 determines the RSSI value of the currently associated AP. Again, the network that the station 200 is currently joined may be with an AP that provides both the 2.4 GHz and 5 GHz operating bands and the station 200 is currently joined to the BSS for the 5 GHz operating band. In step 910, the roam application 235 determines whether the RSSI value with the currently associated AP is above the upper bound of the RSSI bracket in the DBSA configurations 505. If the RSSI value is greater, the method 900 continues to step 915 in which no roam is performed. Again, since the current connection to the network has a good coverage, the station 200 may exchange data in a sufficient manner that an opportunistic roam may not be preferred. Subsequently, the method 700 returns to step 905. However, it is again noted that the roam application 235 may still perform a different manner of opportunistic roam when the DMA configurations 505 include further ranges in the RSSI bracket in which the station 200 may currently be experiencing regarding the RSSI value with the currently associated AP.

If the RSSI value to the currently associated AP is within the upper and lower bounds of the RSSI bracket (e.g., lower than the upper bound of −75 dBm), the method 900 continues to step 920. In step 920, the roam application 235 performs a full roam scan. In step 925, the roam application 235 determines whether the 2.4 Ghz operating band for the currently associated AP is found. When the roam application 235 finds this network, the method 900 continues to step 930 where the opportunistic roam is performed from the BSS of the 5 GHz operating band to the BSS of the 2.4 GHz operating band for the currently associated AP. Those skilled in the art will understand that such a roam may regain the range to the AP since the 2.4 GHz operating band provides a greater coverage area than the 5 GHz operating band.

Although unlikely that the network in the 2.4 GHz operating band for the currently associated AP will not be found, if this is the case, the method 800 continues to step 935. In step 935, the roam application 235 determines whether any other candidates are available from the full roam scan that was performed. If other candidates are not found, the method 900 continues to step 940 in which the roam application 235 waits the time period T1 and returns to step 920 to perform another full roam scan. Although not illustrated in the method 900, the roam application 235 may also perform partial roam scans and utilize the backoff period p as indicated in the DBSA configurations 505 for the current band bracket of 5 GHz.

Returning to step 935, if other roam candidate APs are found, the method 900 continues to step 945. In step 945, the roam application determines whether the RSSI value for the currently associated AP and the RSSI value for the candidate AP results in a difference value that is greater than the RSSI delta of +12 dBm. As described above and as indicated in the DBSA configurations 505, if the roam candidate AP is operating in the 2.4 GHz operating band, the roam application 235 initially adds the boost delta of +10 dBm prior to determining the RSSI delta. Furthermore, if the roam candidate AP is operating in the 5 GHz operating band and has a RSSI value of at least −65 dBm, the roam application 235 initially adds the boost delta of +50 dBm prior to determining the RSSI delta. If none of the roam candidate APs satisfy this criteria, the method 900 continues to step 940. However, if the criteria is met, the method 900 continues to step 950 where the roam application 235 performs the opportunistic roam to the roam candidate AP that satisfies the criteria.

It should be noted that after steps 930 or 950 when the opportunistic roam attempt is performed and a successful roam occurs, as indicated in the method 600 of FIG. 6, the roam application 235 may determine the roam profile for the station 200. Since the roam may have results in a change of roam profile, the roam application 235 may continue to perform opportunistic roams as a function of the roam profile while the station 200 is still in use.

Figure 10:
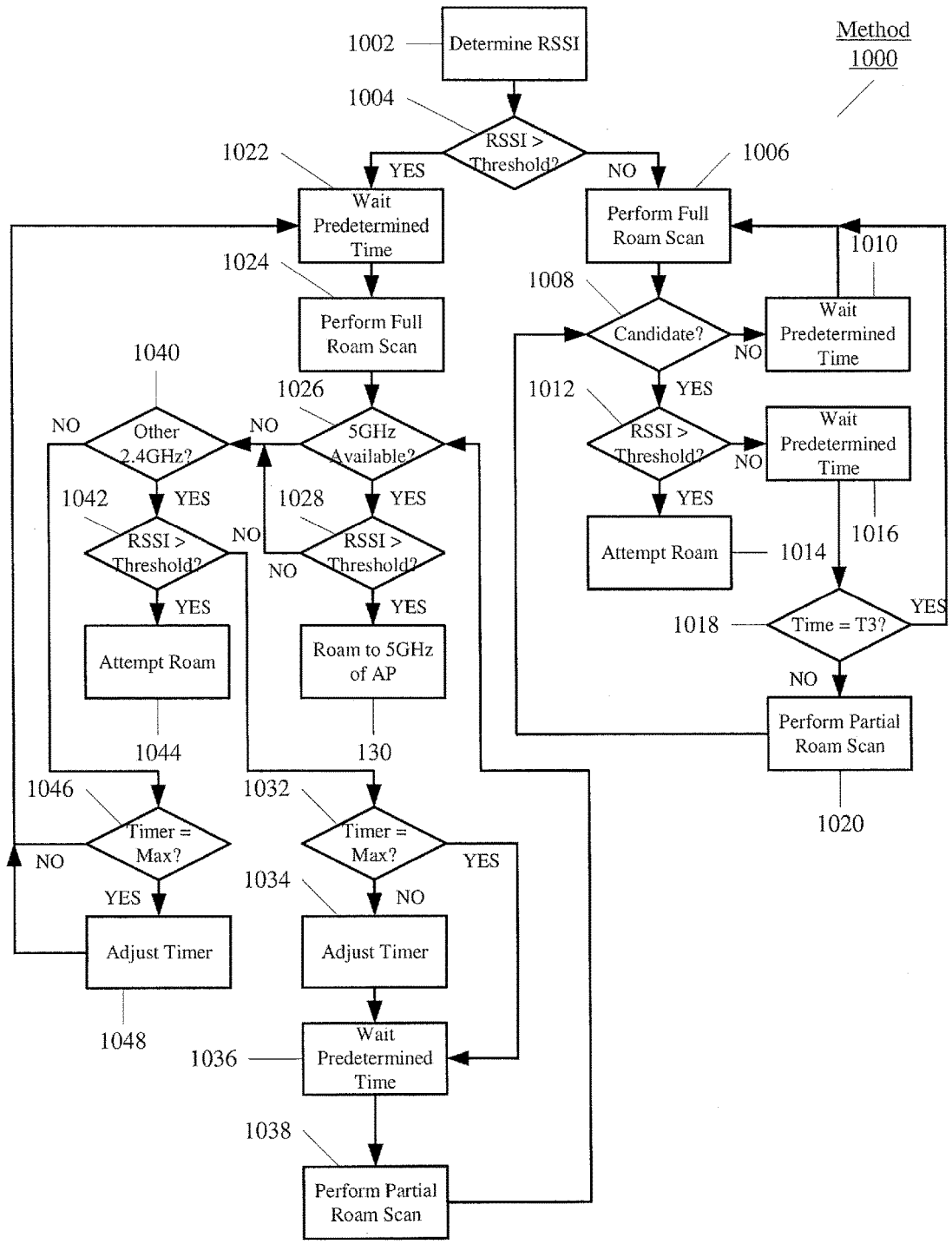
FIG. 10 shows an exemplary method for an opportunistic roam having a multi-AP roaming profile at the 2.4 GHz operating band.

FIG. 10 shows an exemplary method 1000 for an opportunistic roam having a multi-AP roaming profile at the 2.4 GHz operating band. Specifically, the exemplary method 1000 may be for the 2.4 GHz multi-AP roam process determined in step 645 of the method 600 of FIG. 6. As discussed above, the multi-AP roam process may be performed based upon the roam database 240 that includes the multi-AP configurations 510. Also as discussed above, the multi-AP roam process may be performed based upon all or select brackets of the multi-AP configurations 510. For example, the method 1000 will be described with regard to omitting the initial full roam scans N. As will be described in further detail below, the multi-AP roam process may be triggered to look for the 5 GHz operating band or other qualifying roam candidate APs at a low priority when in good coverage.

In step 1002, the roam application 235 determines the RSSI value for the currently associated AP. Again, the network that the station 200 is currently joined may be with an AP that provides only one or both the 2.4 GHz and 5 GHz operating bands and the station 200 is currently joined to the BSS for the 2.4 GHz operating band. In step 1004, the roam application 235 determines whether the RSSI value with the currently associated AP is above the upper bound of −70 dBm of the RSSI bracket in the multi-AP configurations 510 having the high priority. If the RSSI value is lower, the method 1000 continues to step 1006.

In step 1006, the roam application 235 performs a full roam scan across all available channels. In step 1008, the roam application 235 determines whether any candidates are available. If no candidates are available, the method 1000 continues to step 1010. In step 1010, the roam application 235 waits the time period of 30 seconds as indicated in the multi-AP configurations 510. Subsequently, the method 1000 returns to step 1006 to perform the full roam scan.

If candidates are identified, the method 1000 continues to step 1012. In step 1012, the roam application 235 determines whether the RSSI value for the currently associated AP and the RSSI value for the candidate AP results in a value greater than the RSSI delta indicated in the candidate bracket of the multi-AP configurations 510. If the RSSI delta is satisfied, the method 1000 continues to step 1014 in which the roam application 235 attempts the opportunistic roam to join the BSS of the AP having a BSSID operating in a given operating band.

If none of the candidates satisfy the RSSI delta, the method 1000 continues to step 1016. In step 1016, the roam application 235 waits the time period that is either the time period T1 or an adjusted value thereof as indicated by the backoff period p. In step 1018, the roam application 235 determines whether the time since the first initial full roam scan being performed has reached the scan time period T3 of 90 seconds. If this time period T3 has been reached, the method 1000 returns to step 1006 to perform a full roam scan. However, if the time period T3 is not reached, the method 1000 continues to step 1020. In step 1020, the roam application 235 performs a partial roam scan on channels corresponding to the roam candidate APs that were found. Subsequently, the method 1000 returns to step 1008.

Returning to step 1004, if the RSSI value is above the upper bound of −70 dBm for the RSSI bracket having the current band bracket of 2.4 GHz and a high priority, the method 1000 continues to step 1022. In step 1022, the roam application 235 waits the time period T1 of 3 minutes. It should be noted that there may be a further determination as to whether the RSSI value is between −50 dBm and −70 dBm or above −50 dBm. As shown in the multi-AP configurations 510, different values may be associated with a manner of performing roam scans as well as analyzing RSSI values of roam candidate APs. After waiting the time period T1, in step 1024, the roam application 235 performs a full roam scan across all available channels. It should again be noted that since the priority is low for the set of circumstances, the roam application 235 may not trigger the roam scan immediately but wait the time period T1.

In step 1026, the roam application 235 determines whether any network in the 5 GHz operating band is available. For example, the station 200 may be in an area with an AP providing the dual operating bands. In another example, the station 200 may be in an area that includes a network in the 5 GHz operating band which may be preferable. If a network in the 5 GHz operating band is found, the method 1000 continues to step 1026. In step 1028, the roam application 235 determines whether the RSSI value of the currently associated AP and the RSSI value of the roam candidate AP (in the 5 GHz operating band) result in a value greater than the RSSI delta. Since the roam candidate AP is in the 5 GHz operating band, the boost delta of +50 dBm may be added when the boost RSSI is at least −65 dBm prior to determining the RSSI delta. Furthermore, when the RSSI value with the currently associated AP is between −50 dBm and −70 dBm, the RSSI delta may be +15 dBm while if the RSSI value is above −50 dBm, the RSSI delta may be +20 dBm. If the roam candidate AP in the 5 GHz operating band satisfies this criteria, the method 1000 continues to step 1030 where the station 200 roams to this roam candidate AP.

Returning to step 1026, if no network in the 5 GHz operating band is available, the method 1000 continues to step 1040. Also returning to step 1026, if the RSSI delta is not satisfied, the method 1000 also continues to step 1040. In step 1040, the roam application 235 determines whether any other network in the 2.4 GHz operating band is available. Since the area in which the station 200 is located has the multi-AP roam profile, more than one network in the 2.4 GHz operating band and/or more than one network in the 5 GHz operating band may be available. If other networks in the 2.4 GHz operating band is available, the method 1000 continues to step 1042. In step 1042, the roam application 235 determines whether the RSSI value for the currently associated AP and the RSSI value of the roam candidate AP (in the 2.4 GHz operating band) has a difference value greater than the RSSI delta. If this criteria is satisfied, the method 1000 continues to step 1044. In step 1044, the roam application 235 attempts an opportunistic roam to this roam candidate AP.

Returning to step 1040, if no candidate APs are found from the full roam scan, the method 1000 continues to step 1046. In step 1046, the roam application 235 determines whether the time interval between roam scans is at the maximum time T2. If the timer is not maximized, the method 1000 continues to step 1048 where the roam application 235 adjusts the timer accordingly based upon the values in the scan bracket of the multi-AP configurations 510. Subsequently, the method 1000 returns to step 1020. However, upon returning to step 1020, the time period that the roam application 235 waits before performing the full roam scan is adjusted.

Returning to step 1042, if candidates are found but no roam candidate AP satisfies the RSSI delta criteria, the method 1000 continues to step 1032. In step 1032, the roam application 235 determines whether the timer is maximized. If the timer is not maximized, the method 1000 continues to step 1034. In step 1034, the roam application 235 adjusts the timer accordingly as indicated in the scan bracket of the multi-AP configurations 510. In step 1036, the roam application 235 waits the predetermined time based upon the adjusted timer. In step 1038, the roam application 235 performs a partial roam scan across select channels corresponding to the roam candidate APs that were discovered from previous roam scans. Thus, the method 1000 returns to step 1024.

It should be noted that after steps 1014, 1030, or 1044 when the opportunistic roam attempt is performed and a successful roam occurs, as indicated in the method 600 of FIG. 6, the roam application 235 may determine the roam profile for the station 200. Since the roam may have results in a change of roam profile, the roam application 235 may continue to perform opportunistic roams as a function of the roam profile while the station 200 is still in use.

Figure 11:
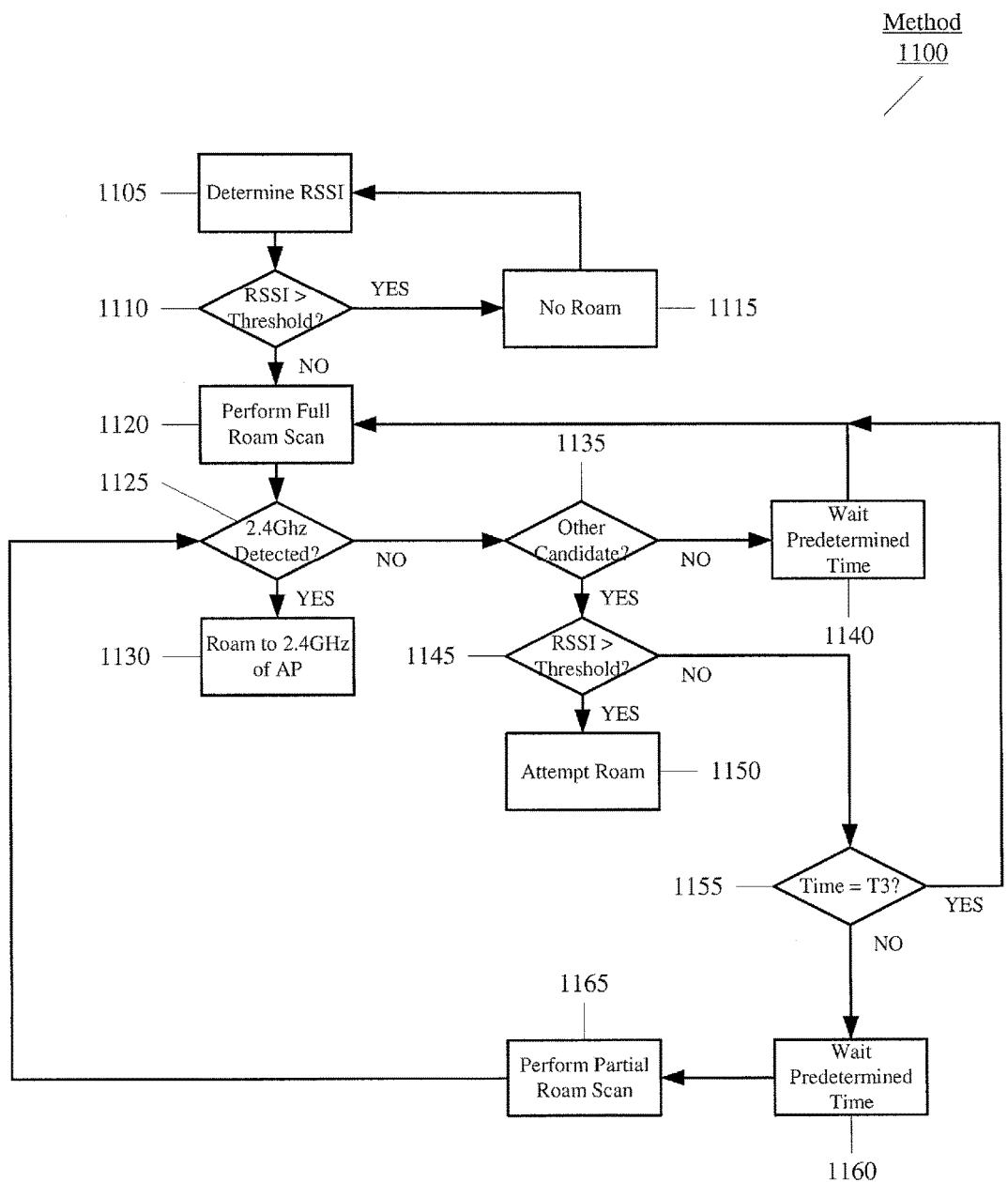
FIG. 11 shows an exemplary method for an opportunistic roam having a multi-AP roaming profile at the 5 GHz operating band.

FIG. 11 shows an exemplary method 1100 for an opportunistic roam having a multi-AP roaming profile at the 5 GHz operating band. Specifically, the exemplary method 1100 may be for the 5 GHz multi-AP roam process determined in step 650 of the method 600 of FIG. 6. As discussed above, the multi-AP roam process may be performed based upon the roam database 240 that includes the multi-AP configurations 510. Also as discussed above, the multi-AP roam process may be performed based upon all or select brackets of the multi-AP configurations 510. For example, the method 1100 will be described with regard to omitting the initial full roam scans N. As will be described in further detail below, the multi-AP roam process may be triggered to look for the qualifying roam candidate APs at a low priority when in good coverage.

In step 1105, the roam application 235 determines the RSSI value for the currently associated AP. Again, the network that the station 200 is currently joined may with an AP that provides only one or both the 2.4 GHz and 5 GHz operating bands and the station 200 is currently joined to the BSS for the 5 GHz operating band. In step 1110, the roam application 235 determines whether the RSSI value is above the upper bound indicated in the multi-AP configurations 510 of the RSSI bracket when the current band bracket is 5 GHz and the priority is high. If the RSSi value is greater, the method 1100 continues to step 1115 in which no roam is performed. Again, since the current connection to the network has a good coverage, the station 200 may exchange data in a sufficient manner that an opportunistic roam may not be preferred. Subsequently, the method 1100 returns to step 1105. However, it is again noted that the roam application 235 may still perform a different manner of opportunistic roam when the multi-AP configurations 510 include further ranges in the RSSI bracket in which the station 200 may currently be experiencing regarding the RSSI value with the currently associated AP.

If the RSSI value to the currently associated AP is less than the upper bound of the RSSI bracket (e.g., less than −70 dBm), the method 1100 continues to step 1120. In step 1120, the roam application 235 performs a full roam scan across all available channels. In step 1125, the roam application 235 determines whether any 2.4 GHz operating band for the currently associated AP is found. It should be noted that the roam application 235 may be aware that the currently associated AP provides both the 2.4 GHz and 5 GHz operating band. When the roam application 235 finds this network, the method 1100 continues to step 1130 where the opportunistic roam is performed from the BSS of the 5 GHz operating band to the BSS of the 2.4 GHz operating band for the currently associated AP. Those skilled in the art will understand that such a roam may regain the range to the AP since the 2.4 GHz operating band provides a greater coverage area than the 5 GHz operating band.

If the network in the 2.4 GHz operating band is not found, the method 1100 continues to step 1135. in step 1135, the roam application 235 determines whether any other candidates are available from the full roam scan that was performed. If no other candidates are discovered, the method 1100 continues to step 1140 in which the roam application 235 waits the time period T1 and returns to step 1120 to perform another full roam scan.

Returning to step 1135, if further candidates are discovered from the full roam scan, the method 1100 continues to step 1145. In step 1145, the roam application 235 determines whether the RSSI value for the currently associated AP and the RSSI value for the roam candidate AP has a difference value greater than the RSSI delta indicated in the multi-AP configurations 510. If this criteria is satisfied, the method 1100 continues to step 1150. In step 1150, the roam application 235 attempts an opportunistic roam to this roam candidate AP.

If no roam candidate AP satisfies the RSSI delta criteria, the method 1100 continues to step 1155. In step 1155, the roam application 235 determines whether the time since the initial first full roam scan was performed has reach the full scan time period T3. If the time period T3 has been reached, the method 1100 returns to step 1120 to perform a full roam scan in order to refresh the channel cache.

If the time period T3 has not been reached, the method 1100 continues to step 1160 to wait the predetermined time. It should be noted that the timer for which the roam application 235 determines the time interval prior to performing a further roam scan may be adjusted using the values indicated in the scan bracket of the multi-AP configurations 510. After waiting this period, the method 1100 continues to step 1165. In step 1165, the roam application 235 performs a partial roam scan on select channels corresponding to the roam candidate APs that were discovered from previous roam scans. The method 1100 then returns to step 1125.

It should be noted that after steps 1130 or 1150 when the opportunistic roam attempt is performed and a successful roam occurs, as indicated in the method 600 of FIG. 6, the roam application 235 may determine the roam profile for the station 200. Since the roam may have results in a change of roam profile, the roam application 235 may continue to perform opportunistic roams as a function of the roam profile while the station 200 is still in use.

It should be noted that the above described manner of performing the opportunistic roam may be performed with various modifications or considerations. In a first example, the use of only the RSSI as the criteria to perform the opportunistic roam is only exemplary. The roam application 235 may be configured to further consider other determining factors such as channel utilization, channel bandwidth, BSS capabilities (e.g., same or better than currently associated AP), data rate support, etc. These further factors may have brackets within the roam database 240 having set values or thresholds. These further factors may also have different weights than the RSSI such that all factors may or may not have equal contribution in determining whether to perform the opportunistic roam.

In a second example, the use of initial full roams scans is only exemplary. As discussed above, to conserve power, the station 200 may receive scan information from any source such as the currently associated AP. For example, the currently associated AP may include a steering mechanism such that network related information may be provided. Specifically, the network related information may have an Abridged field that is set with the payload of the network related information including various recommended roam candidate APs. In this manner, the roam application 235 may initially use a partial roam scan rather than a full roam scan.

In a third example, the behavior of low priority roams may have a predetermined manner of being performed based upon the state of the station 200. For example, the behavior of the low priority roams may be the same between a sleep state and a wake state of the station 200. The bracket values of the configurations may also be modified based upon the state of the station 200. For example, the triggers for the lower bound of the RSSI bracket in a high priority roam may be lowered when the station 200 goes to sleep for minimizing roam attempts and extend battery life. In another example, regardless of the priority value, all roam triggers and scan/join attempts may occur without involvement from the station 200 such that a wakeup does not result when the processor 205 is asleep.

In a fourth example, in addition to the environment factor and the sleep/wake state of the station 200, the roam application 235 may incorporate other factors that contribute to whether the opportunistic roam is to be performed. For example, different networking applications may have different bandwidth/performance requirements in which case the station 200 may need to tune up/down the aggressiveness of roam attempts. Thus, the brackets of the configurations may further be modified based upon these requirements. Similarly, for power requirements, at a certain battery threshold or percentage of remaining power in a portable power supply, the station 200 may disable/re-enable the opportunistic roam feature. Still other factors may include whether the station 200 has access to a permanent power supply, whether the station 200 is mobile or stationary, transmission control protocol (TCP)/Internet protocol (IP) packet statistics, etc.

The exemplary embodiments provide a device and method for performing an opportunistic roam by a roam application of a station. The opportunistic roam may be a functionality that is used prior to a requirement of a legacy roam functionality being performed. For example, the opportunistic roam functionality may relate to RSSI values that have not reached as low as a minimum threshold related to RSSI values of the legacy roam functionality. The opportunistic roam functionality may be based upon a roam profile of a network in which the station is currently joined as well as interconnections of the area in which the station is located and potential areas in which the station may be located. The roam application may initially generate a roam database including roam clusters of the various areas of a network arrangement such that a roam profile for each area is determined. By identifying the roam profile for the station in the currently joined network, the roam application may determine the manner in which the opportunistic roam is to be performed based upon predetermined values indicated in the roam database for configurations respective of the roam profile.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile hardware device running iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
   at a station joined to a basic service set (BSS) of an access point (AP):
   determining whether the BSS of the AP and a BSS identification (BSSID) of the AP are known by the station;
   when the BSS and the BSSID are known to the station and prior to performing a scan after the station has joined to the BSS of the AP, determining a roam cluster associated with the BSS and the BSSID;
   determining a roam profile based on the roam cluster, the roam profile indicating at least one of available operating bands or available APs for the station;
   determining a first value associated with a network parameter of the AP;
   determining at least one roam candidate AP having a second value associated with the network parameter, wherein the network parameter comprises a received signal strength indicator, wherein the roam profile is determined prior to the determining of the at least one roam candidate AP;
   determining whether a predetermined criteria value is satisfied based upon the first and second values, wherein the predetermined criteria value comprises a minimum difference between the first value and second value; and
   roaming to the roam candidate AP when the predetermined criteria value is satisfied.

2. The method of claim 1, wherein the roam profile is one of a single band single AP (SBSA) roam profile, a dual band single AP (DBSA) roam profile, or a multi-AP roam profile.

3. The method of claim 1, wherein the available operating bands includes at least one of 2.4 GHz or 5 GHz.

4. The method of claim 1, further comprising:
   performing a full roam scan across all available channels to discover the at least one roam candidate AP.

5. The method of claim 4, further comprising:
   performing a partial roam scan across select channels corresponding to the at least one discovered roam candidate AP.

6. The method of claim 5, wherein a first one of the partial roam scan is performed after a first time period, wherein a second one of the partial roam scan is performed after a second time period, the second time period having an adjusted value based upon the first time period.

7. The method of claim 4, further comprising:
   determining a priority value based upon the first value.

8. The method of claim 7, wherein the full roam scan is performed immediately upon determining the first value when the priority value is a first priority value.

9. The method of claim 7, wherein the full roam scan is performed after a predetermined time period when the priority value is a second priority value.

10. The method of claim 1, further comprising:
    determining the roam cluster for a geographic location of the station, wherein the roam cluster is an aggregation of areas having interconnections.

11. The method of claim 10, wherein the interconnections indicate when a potential roam may be performed.

12. A station, comprising:
    a transceiver configured to establish a connection with an access point (AP) for the station to join a basic service set (BSS) thereof; and
    a processor;
    wherein the processor and transceiver are configured to perform an opportunistic roam from the AP to one of at least one roam candidate AP by:
    determining whether the BSS of the AP and a BSS identification (BSSID) of the AP are known by the station;
    when the BSS and the BSSID are known to the station and prior to performing a scan after the station has joined to the BSS of the AP, determining a roam cluster associated with the BSS and the BSSID;
    determining a roam profile based on the roam cluster, the roam profile indicating at least one of available operating bands or available APs for the station;
    determining a first value associated with a network parameter for the AP;
    scanning for the at least one roam candidate AP, wherein the roam profile is determined prior to the scanning;
    determining the at least one roam candidate AP having a second value associated with the network parameter;
    determining whether a predetermined criteria value is satisfied based upon the first and second values; and
    roaming to the roam candidate AP when the predetermined criteria value is satisfied.

13. The station of claim 12, wherein the roam profile is one of a single band single AP (SBSA) roam profile, a dual band single AP (DBSA) roam profile, and a multi-AP roam profile.

14. The station of claim 12, wherein the available operating bands includes at least one of 2.4 GHz or 5 GHz.

15. The station of claim 12, wherein the processor is configured to perform a full roam scan across all available channels to discover the at least one roam candidate AP.

16. The station of claim 15, wherein the processor is configured to perform a partial roam scan across select channels corresponding to the at least one roam candidate AP that has been discovered.

17. The station of claim 16, wherein a first one of the partial roam scan is performed after a first time period, wherein a second one of the partial roam scan is performed after a second time period, the second time period having an adjusted value based upon the first time period.

18. The station of claim 15, wherein the processor is configured to determine a priority value based upon the first value.

19. The station of claim 18, wherein the full roam scan is performed immediately upon determining the first value when the priority value is a first priority value.

20. A non-transitory computer readable storage medium with an executable program stored thereon, wherein the program instructs a microprocessor to perform operations comprising:
    determining whether a BSS of an access point (AP) and a BSS identification (BSSID) of the AP are known by a station;

when the BSS and the BSSID are known to the station and prior to performing a scan after the station has joined to the BSS of the AP, determining a roam cluster associated with the BSS and the BSSID;

determining a roam profile based on the roam cluster, the roam profile indicating at least one of available operating bands or available APs for the station;

determining a first value associated with a network parameter for a joined AP;

determining at least one roam candidate AP having a second value associated with the network parameter, wherein the roam profile is determined prior to the determining of the at least one roam candidate AP;

determining whether a predetermined criteria value is satisfied based upon the first and second values; and roaming to the roam candidate AP when the predetermined criteria value is satisfied.

* * * * *